(12) United States Patent
Sugiyama et al.

(10) Patent No.: US 9,134,700 B2
(45) Date of Patent: Sep. 15, 2015

(54) DISPLAY DEVICE

(75) Inventors: Keiji Sugiyama, Kyoto (JP); Kakuya Yamamoto, Hyogo (JP); Kenichi Kasazumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 349 days.

(21) Appl. No.: 13/807,194

(22) PCT Filed: Mar. 23, 2012

(86) PCT No.: PCT/JP2012/002047
§ 371 (c)(1),
(2), (4) Date: Dec. 27, 2012

(87) PCT Pub. No.: WO2012/147271
PCT Pub. Date: Nov. 1, 2012

(65) Prior Publication Data
US 2013/0106847 A1    May 2, 2013

(30) Foreign Application Priority Data
Apr. 27, 2011 (JP) ................. 2011-099883

(51) Int. Cl.
*G03H 1/22* (2006.01)
*H04N 9/31* (2006.01)
(Continued)

(52) U.S. Cl.
CPC .......... *G03H 1/2294* (2013.01); *G02B 27/0103* (2013.01); *G09G 3/003* (2013.01);
(Continued)

(58) Field of Classification Search
CPC ............ G03H 1/2294; G03H 2222/34; G03H 2225/60; G03H 2227/02; G03H 2270/55; G09G 2320/0233; G09G 2320/0252; G09G 2320/0285; G09G 2360/144; G09G 2360/145; G09G 3/003; H04N 9/3161
USPC ............ 348/42, 40, 51, 52, 58; 345/419, 420, 345/589
See application file for complete search history.

(56) References Cited

U.S. PATENT DOCUMENTS 6,900,778 B1  5/2005  Yamamoto
7,053,925 B2 *  5/2006  Payne et al. ..................... 348/42
(Continued)

FOREIGN PATENT DOCUMENTS

JP  6-202575  7/1994
JP  8-240773  9/1996
(Continued)

OTHER PUBLICATIONS

International Search Report issued May 29, 2012 in International (PCT) Application No. PCT/JP2012/002047.

*Primary Examiner* — Behrooz Senfi
(74) *Attorney, Agent, or Firm* — Wenderoth, Lind & Ponack, L.L.P.

(57) ABSTRACT

A display device (1) includes: a light source (101) that outputs a laser beam; an illumination optical system (102) that emits illumination light of the laser beam; a diffraction pattern generation unit that generates a diffraction pattern from original image data; a spatial modulation element (103) that diffracts the illumination light by displaying the diffraction pattern; and a display control unit that performs at least one of a change in a display timing of a diffraction pattern the spatial modulation element (103) displays and a change in a size of a diffraction pattern the diffraction pattern generation unit generates.

10 Claims, 21 Drawing Sheets

(51) Int. Cl.
*G09G 3/00* (2006.01)
*G02B 27/01* (2006.01)

(52) U.S. Cl.
CPC ....... *H04N 9/3161* (2013.01); *G02B 2027/014* (2013.01); *G02B 2027/0178* (2013.01); *G03H 2222/34* (2013.01); *G03H 2225/60* (2013.01); *G03H 2227/02* (2013.01); *G03H 2270/55* (2013.01); *G09G 2320/0233* (2013.01); *G09G 2320/0252* (2013.01); *G09G 2320/0285* (2013.01); *G09G 2360/144* (2013.01); *G09G 2360/145* (2013.01)

(56) References Cited

U.S. PATENT DOCUMENTS

| | | | |
|---|---|---|---|
| 7,535,607 | B2 | 5/2009 | Schwerdtner et al. |
| 7,636,184 | B2 | 12/2009 | Schwerdtner |
| 7,782,510 | B2 | 8/2010 | Wilson et al. |
| 7,969,633 | B2 | 6/2011 | Schwerdtner |
| 8,294,749 | B2 | 10/2012 | Cable |
| 2002/0008887 | A1 | 1/2002 | Horikoshi et al. |
| 2004/0021768 | A1 | 2/2004 | Payne et al. |
| 2006/0119539 | A1 | 6/2006 | Kato et al. |
| 2006/0139710 | A1 | 6/2006 | Schwerdtner |
| 2006/0139711 | A1 | 6/2006 | Leister et al. |
| 2006/0250671 | A1 | 11/2006 | Schwerdtner et al. |
| 2008/0259419 | A1 | 10/2008 | Wilson et al. |
| 2009/0219380 | A1* | 9/2009 | Cable ............... 348/40 |
| 2009/0225380 | A1 | 9/2009 | Schwerdtner et al. |
| 2009/0290203 | A1 | 11/2009 | Schwerdtner |
| 2009/0296176 | A1 | 12/2009 | Leister |
| 2010/0165430 | A1* | 7/2010 | Buschbeck ............ 359/9 |
| 2010/0271678 | A1 | 10/2010 | Wilson et al. |
| 2010/0277566 | A1* | 11/2010 | Cable et al. ......... 348/40 |
| 2011/0109948 | A1 | 5/2011 | Cable |
| 2011/0248905 | A1 | 10/2011 | Chosokabe et al. |

FOREIGN PATENT DOCUMENTS

| | | |
|---|---|---|
| JP | 10-268739 | 10/1998 |
| JP | 11-316539 | 11/1999 |
| JP | 2000-298246 | 10/2000 |
| JP | 2003-536297 | 12/2003 |
| JP | 2004-233908 | 8/2004 |
| JP | 2007-193254 | 8/2007 |
| JP | 2008-525832 | 7/2008 |
| JP | 2008-541145 | 11/2008 |
| JP | 2009-509183 | 3/2009 |
| JP | 2010-511899 | 4/2010 |
| JP | 2010-513962 | 4/2010 |
| JP | 2011-507022 | 3/2011 |
| JP | 2011-221236 | 11/2011 |

* cited by examiner

FIG. 8
| RESOURCE TYPE | RESOURCE AMOUNT | ALLOWABLE INDIVIDUAL COST |
|---|---|---|
| REMAINING AMOUNT OF BATTERY | 50% OR MORE | 100 |
| | LESS THAN 50% | 50 |
| CPU UTILIZATION RATIO | 50% OR MORE | 100 |
| | LESS THAN 50% | 50 |
ALLOWABLE MAXIMUM COST = 200
FIG. 9A
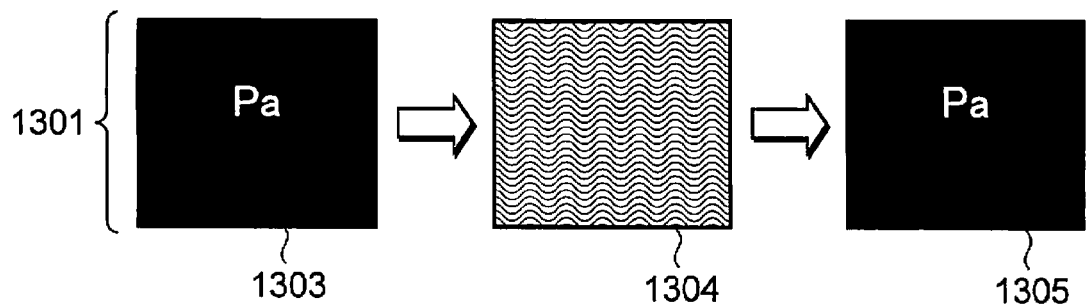
FIG. 9B
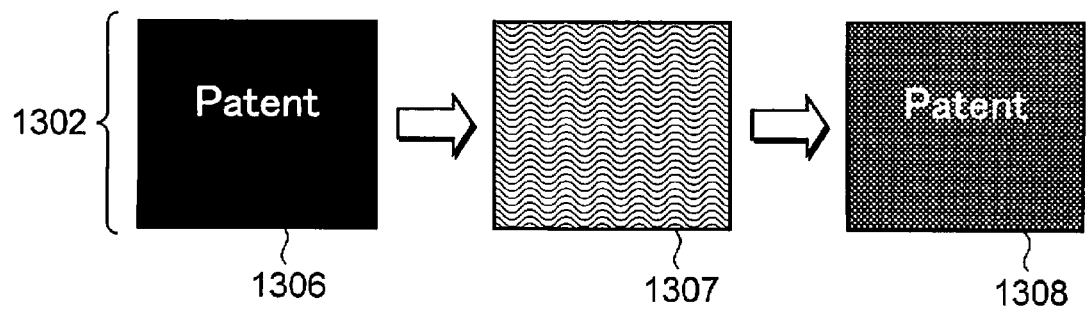

FIG. 10

| RESOURCE TYPE | RESOURCE AMOUNT | ALLOWABLE INDIVIDUAL NOISE |
|---|---|---|
| HIGH BRIGHTNESS DISTRIBUTION RATIO | 50% OR MORE | 100 |
| | LESS THAN 50% | 50 |
| PERIPHERAL BRIGHTNESS VALUE | 50% OR MORE | 100 |
| | LESS THAN 50% | 50 |

ALLOWABLE MAXIMUM NOISE = 200

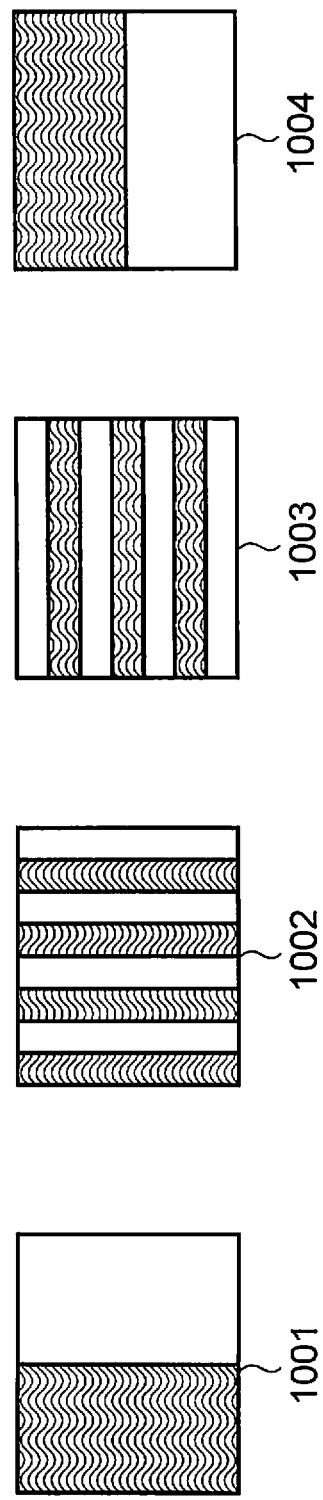

| RESOURCE TYPE | RESOURCE AMOUNT | ALLOWABLE INDIVIDUAL COST |
|---|---|---|
| REMAINING AMOUNT OF BATTERY | 50% OR MORE | 100 |
| | LESS THAN 50% | 50 |
| COMMUNICATION BAND | 50% OR MORE | 100 |
| | LESS THAN 50% | 50 |
| CPU UTILIZATION RATIO | 50% OR MORE | 100 |
| | LESS THAN 50% | 50 |

ALLOWABLE MAXIMUM COST = 300

401

402

DISPLAY DEVICE

TECHNICAL FIELD

The present invention relates to a display device, such as a head-mounted display, that displays information by diffracting a laser beam using a diffraction pattern generated by a computer generated hologram.

BACKGROUND ART

A head-mounted display (hereafter "HMD") is a device that displays information to a user in a state of being mounted on the head of the user. In terms of mounting on the head, generally it is preferable that the HMD is compact and light, but in terms of display performance, it is preferable that the screen is large and image quality is high. In conventional HMDs, there is a method of optically magnifying an image displayed on a compact crystal panel or the like using a convex lens, a free-form surface prism or the like, so that an expanded fictive image is displayed to the user (e.g. see Patent Document 1). This method of magnifying images with a prism is called an "optical magnification method" in this specification.

In a display device using a computer generated hologram (hereafter "CGH"), a diffraction pattern, which is calculated by a computer using an image to be displayed as input data, is displayed on a phase modulation type liquid crystal panel, and a laser beam is irradiated onto the liquid crystal panel and is diffracted, whereby the wavefront of the display light from the fictive image position is reproduced, and the fictive image is displayed to the user (e.g. see Patent Document 2). The CGH method is characterized in that a three-dimensional stereoscopic image can be displayed at a position near side of or behind the liquid crystal panel. There is also a conventional art that displays a three-dimensional stereoscopic image to a user using a diffraction pattern, although a CGH method is not used (e.g. see Patent Document 3).

However, in the CGH method, a computation cost to generate a diffraction pattern to be displayed on a liquid crystal panel or the like presents a problem. In general, in computing a diffraction pattern, a diffraction pattern is generated from an image to be displayed to the user (hereafter "original image") using a generation method based on a point filling method or a Fourier transform. FIG. 22 shows this example.

FIG. 22A shows an example of an original image 401, and FIG. 22B shows an example of a diffraction pattern 402 generated from the original image 401. By displaying this diffraction pattern 402 on a phase modulation type liquid crystal panel or the like, the user can visually recognize the original image 401 based on which the diffraction pattern 402 is generated. On generating this diffraction pattern 402, a display with a higher resolution and a wider viewing angle is implemented as the number of pixels of the original image 401 and the number of pixels of the liquid crystal panel increases, but this also increases the computation amount to generate the diffraction pattern 402.

Now an example of a computation method to generate a diffraction pattern using the point filling method will be described. In the case of the point filling method, an original image (object) is regarded as a set of point light sources, and a diffraction pattern is computed from a phase when the light from each point light source overlaps at each point on the liquid crystal panel.

FIG. 23 is a diagram depicting an example of a positional relationship between an original image 501 and a liquid crystal panel 502 that displays a diffraction pattern on generating the diffraction pattern. In order to generate the diffraction pattern to be displayed on the liquid crystal panel 502 using the point filling method, each point (each pixel) on the original image 501 is regarded as a point light source, as described above. If a point i on the original image 501 has an amplitude $\alpha_i$ and a phase $\phi_i$, a complex amplitude of the light generated from this point i, observed at a point u on the liquid crystal panel 502, is given by the following Expression (1).

$r_i$ in Expression (1) denotes a distance between the point i and the point u, and $r_i$ is computed by the following Expression (2), where the origin is the center of the liquid crystal panel 502, the coordinates of the point i are $(x_i, y_i, z_i)$, and the coordinates of the point u are $(\xi, \eta)$.

k in Expression (1) denotes a wave number, and is given by $k=2\pi/\lambda$, where $\lambda$ denotes a wavelength of the light from the point i. As the complex amplitude of the light from the point i is determined at the point u by the computation using Expression (1), the same computation is performed at each point on the original image 501, and the results are added, whereby the value of the complex amplitude at the point u on the liquid crystal panel 502 can be determined. Expression (3) is an expression to indicate a complex amplitude at the point u.

In the point filling method, a diffraction pattern is generated by performing computation of Expression (3) for each point on the liquid crystal panel 502. In this example, a change of a phase due to a reference light or the like is not illustrated to simplify description.

$$u_i(\xi, \eta) = \frac{a_i}{r_i}\exp\{-j(kr_i + \phi_i)\} \quad (1)$$

$$r_i = \sqrt{(\xi - x_i)^2 + (\eta - y_i)^2 + z_i^2} \quad (2)$$

$$u(\xi, \eta) = \sum_{i=1}^{N} u_i(\xi, \eta) \quad (3)$$

As Expression (1) to Expression (3) indicate, when the number of pixels of the original image 501 and the number of pixels of the liquid crystal panel 502 (the number of pixels of the diffraction pattern) increase, the required number of times of computation increases and the computation cost increases. When a method of generating a diffraction pattern by performing an inverse Fourier transform on the original image 501 is used, computation speed becomes faster but the computation cost increases since the number of pixels increases. In a case where the computation capability of a CGH type display device does not satisfy the requirement of the computation cost for generating the diffraction pattern, the quality of the image displayed to the user drops, including a drop in frame rate. Patent Documents 2 and 3 do not consider this point.

Patent Document 1: Japanese Patent Unexamined Publication No. H8-240773

Patent Document 2: Japanese Translation of PCT Application No. 2008-541145

Patent Document 3: Japanese Patent Unexamined Publication No. H6-202575

SUMMARY OF INVENTION

To solve the above mentioned conventional problems, it is an object of the present invention to provide a CGH type display device that can suppress a drop in image quality of the original image visually recognized by the user.

A display device according to an aspect of the present invention has: a light source that outputs a laser beam; an illumination optical system that emits illumination light of the laser beam; a diffraction pattern generation unit that generates a diffraction pattern from original image data; a spatial modulation element that diffracts the illumination light by displaying the diffraction pattern; and a display control unit that performs at least one of a change in a display timing of a diffraction pattern the spatial modulation element displays and a change in a size of a diffraction pattern the diffraction pattern generation unit generates.

According to the display device of the present invention, a diffraction pattern can be suitably generated by changing at least one of a display timing of a diffraction pattern and a size of a diffraction pattern. Therefore, it becomes possible to provide a CGH type display device which can suppress a drop in image quality of the image visually recognized by a user.

BRIEF DESCRIPTION OF DRAWINGS

FIG. 3 is a diagram depicting a positional relationship of an eyeball, a reflecting mirror, a spatial modulation element, a reconstructed image generated by a diffraction pattern, and the like.

FIG. 4 is a diagram depicting a positional relationship of an eyeball, a reflecting mirror, a spatial modulation element, a reconstructed image generated by a diffraction pattern, and the like.

FIG. 8 shows an example of an allowable computation cost determination table according to Embodiment 1.

FIG. 9A shows an example of a reconstructed image when the number of high brightness pixels is small in the brightness distribution of an original image, and FIG. 9B shows an example of a reconstructed image when the number of high brightness pixels is large in the brightness distribution of an original image.

FIG. 10 shows an example of an allowable computation noise determination table according to Embodiment 1.

FIG. 12 shows examples of a diffraction pattern of which size is reduced.

FIG. 19 shows an example of an allowable computation cost determination table according to Embodiment 2.

DESCRIPTION OF EMBODIMENTS

Embodiments of the present invention will now be described with reference to the drawings.

Embodiment 1

Figure 1:
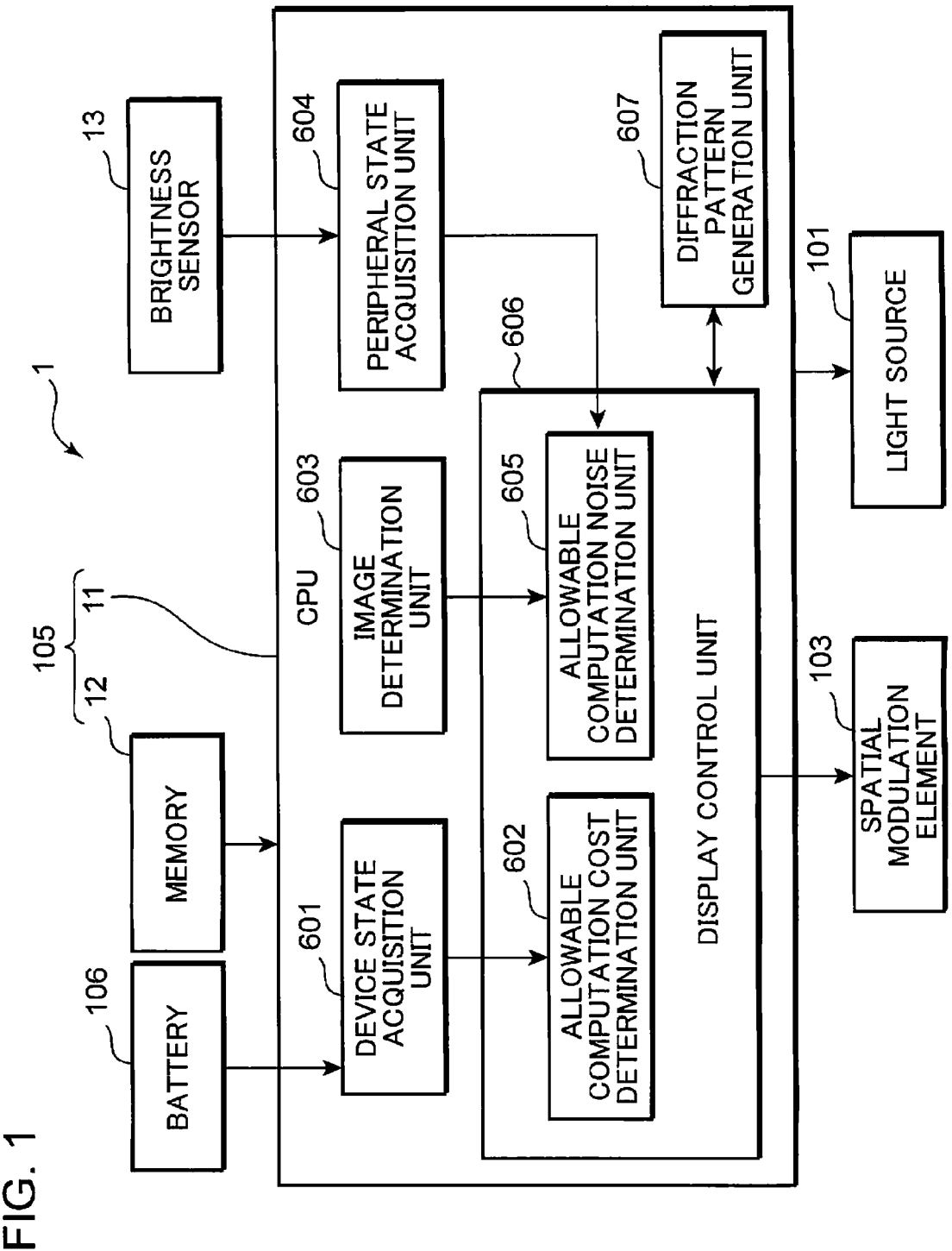
FIG. 1 is a functional block diagram of a display device according to Embodiment 1.
Figure 2:
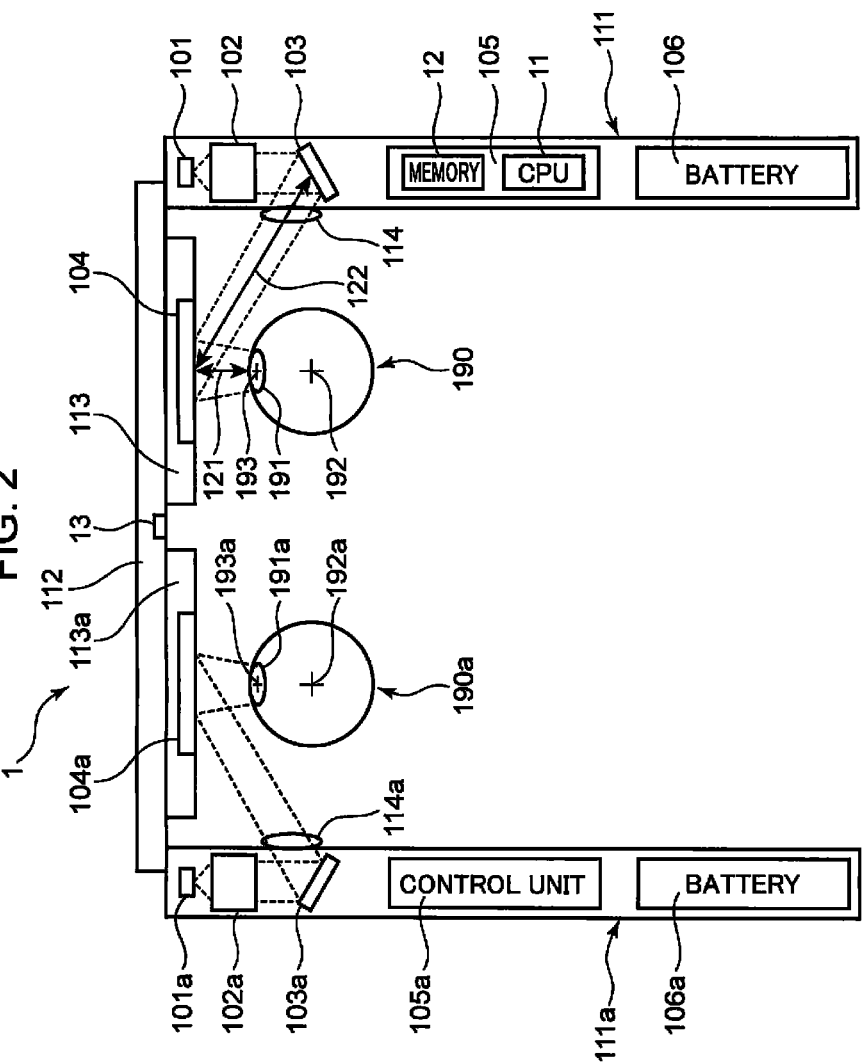
FIG. 2 is a schematic diagram depicting a configuration of the display device shown in FIG. 1.

FIG. 1 is a functional block diagram of a head-mounted display device (HMD) 1 according to Embodiment 1. FIG. 2 is a schematic diagram depicting a configuration of the display device 1 shown in FIG. 1. As shown in FIG. 2, the display device 1 of Embodiment 1 has a shape like spectacles, and FIG. 2 is a top view. The configuration of the display device 1 according to Embodiment 1 will now be described with reference to FIG. 1 and FIG. 2.

A light source 101 is a laser light source that outputs a laser beam. In Embodiment 1, a semiconductor laser (laser diode) that outputs a laser beam having a green wavelength is used as the light source 101. A single color of red or blue may be used instead, or three colors of red, green and blue may be multiplexed for color display, or the three colors may be driven by time-division driving to implement color display, as described later. A laser other than a semiconductor laser may be used instead, or a combination of a semiconductor laser and another laser may be used. A combination of an infrared semiconductor laser and a second harmonic generation (SHG) element for converting infrared into green may also be used.

An illumination optical system 102 emits an illumination light generated by changing a wavefront form and intensity distribution of the laser beam from the light source 101. In Embodiment 1, a convex lens for converting the laser beam from a diffused light into a converged light, and a neutral density (ND) filter for attenuating intensity of the laser beam are used as the illumination optical system 102. The element for changing the wavefront form of the illumination light may be a lens or a mirror, or an element that can change dynamically, such as a liquid crystal lens. The illumination optical system 102 may include an optical system for changing the intensity distribution. The illumination optical system 102 may also include a filter to remove an undesired illumination light.

A spatial modulation element 103 diffracts an illumination light from the illumination optical system 102 by displaying a diffraction pattern, so that the user can visually recognize a display image. In Embodiment 1, a phase modulation type reflective liquid crystal panel is used as the spatial modulation element 103. The spatial modulation element 103 may be a different display element only if an illumination light can be diffracted by displaying a diffraction pattern. A transmission panel, for example, may be used for the spatial modulation element 103. In this case, the layout of the optical system can be changed, such as disposing the light source 101 on the ear side of the spectacles.

A reflecting mirror 104 reflects a diffracted light from the spatial modulation element 103 toward an eyeball 190 of a user. In Embodiment 1, a semi-transmission Fresnel mirror is used as the reflecting mirror. A semi-transmission Fresnel mirror is generated by depositing a thin metal film on the Fresnel lens, and gluing the semi-transmission Fresnel mirror to a lens unit 113 on a front portion 112 with adhesive. A refractive index of the Fresnel mirror and that of the adhesive are similar so that the transmitted light can propagate linearly, and the outside world viewed through the lens unit 113 is not distorted. The HMD with which that the user directly views the liquid crystal panel may be used without using the reflecting mirror 104. The reflecting mirror 104 may be a lens type or may be implemented using a diffraction grating such as a hologram. When the reflecting mirror 104 is constructed by a hologram, a see-through display that is slimmer and has higher transmittance can be constructed.

The eyeball 190 illustrates an eyeball at an assumed eyeball position of the display device 1 of Embodiment 1. The assumed eyeball position is a position where the eyeball is assumed to be located when the user is mounting the display device 1 on the head. In Embodiment 1, the assumed eyeball position is a pupil center 193 of a pupil 191 of the eyeball 190 when the user is mounting the display device 1. The diffracted light reflected by the reflecting mirror 104 forms an image on a retina, via the pupil 191 of the eyeball 190 located at the assumed eyeball position, and displays an image to the user. An eyeball center 192 in FIG. 2 is a center position of the eyeball 190, and is also a rotation center of the eyeball 190. The assumed eyeball position may be slightly shifted from the pupil center 193. The assumed eyeball position may be the eyeball center 192, instead of the pupil center 193.

When the user mounts the display device 1 shown in FIG. 2 on the head (that is, hooks a temple unit 111 over the ears), the positional relationship between the spatial modulation element 103 and the assumed eyeball position is fixed. An allowable error may be set for the assumed eyeball position considering the difference of the position of the eyeball 190 with respect to the head area depending on the respective user and the shift of the display device 1 during mounting, or a function to adjust the assumed eyeball position may be provided.

A control unit 105 drives the light source 101 and causes the spatial modulation element 103 to display a diffraction pattern. The control unit 105 turns the light source 101 on and off, and adjusts the intensity of the laser beam outputted by the light source 101 so that an appropriate light quantity enters the eyeball. The control unit 105 may drive the three colors of laser light sources by time-division, and display diffraction patterns corresponding to the three colors respectively on the spatial modulation element 103 synchronizing with the light sources 101, so as to perform color display. The control unit 105 may control a battery 106, or may control the illumination optical system 102 and the reflecting mirror 104, in a case where these elements are controllable.

In Embodiment 1, the control unit 105 includes a CPU 11 and a memory 12, and performs a generation control of a diffraction pattern considering computation cost and the like. The CPU 11 includes a device state acquisition unit 601, an image determination unit 603, a peripheral state acquisition unit 604, a display control unit 606 and a diffraction pattern generation unit 607 as functional blocks, and the display control unit 606 includes an allowable computation cost determination unit 602 and an allowable computation noise determination unit 605. The memory 12 stores programs. The memory 12 also temporarily stores data. The CPU 11 implements each of the above mentioned functional blocks by executing programs stored in the memory 12. The function of each functional block in FIG. 1 will be described later. A brightness sensor 13 is disposed approximately at the center of the front portion 112 in the horizontal direction in FIG. 2. The brightness sensor 13 detects peripheral brightness and outputs the detection result to the peripheral state acquisition unit 604.

The battery 106 supplies power to each component of the display device 1, such as the control unit 105 and the spatial modulation element 103. The battery 106 of Embodiment 1 is a rechargeable type, and is charged when the display device 1 is not mounted on the user. The battery 106 is disposed near the end of a temple portion 111 on the ear side, so that the weight balance as an entire device is more toward the ear side, whereby the slipping down of the front portion 112 can be minimized. The battery 106 need not be a rechargeable type, and power may be supplied when the display device 1 is in use. Power may be supplied to the display device 1 from the outside, or the display device 1 may have a generating unit.

The display device 1 in the shape of spectacles shown in FIG. 2 is constituted by the temple portion 111 that is positioned on the side of the head, and the front portion 112 that is positioned in front of an eye. The light source 101, the illumination optical system 102, the spatial modulation element 103, the control unit 105 and the battery 106 are disposed in the temple portion 111. An emitting window 114 is disposed in the temple portion 111 so that the diffracted light from the spatial modulation element 103 is emitted to the reflecting mirror 104.

The front portion 112 includes the lens unit 113, and the reflecting mirror 104 is disposed in a part (front surface or inside) of the lens unit 113. The reflecting mirror 104 of Embodiment 1 transmits the outside view while reflecting the display light, but the reflecting mirror 104 may be configured such that the outside view is not transmitted. The front portion 112 and the temple portion 111 may be folded in order to improve portability. In this case, the folding position may be the edge of the temple portion 111 or the ear side with respect to the spatial modulation element 103. The lens unit 113 may be a lens for near sightedness, just like the case of a regular spectacle lens, or may be a lens for correcting far sightedness or astigmatism. The lens unit 113 may have a function to drop transmittance just like sunglasses, or may have a polarizing function. The lens unit 113 may prevent the reflection of undesired light, or may include a film having a function to prevent contamination.

According to Embodiment 1, a fictive image is displayed for both the left and right eyes of the user. Therefore, as FIG. 2 shows, the same composing elements as the right eye portion are disposed for the left eye portion. Each composing element of the left eye portion of the display device 1 is denoted with a same reference numeral of the corresponding composing element of the right eye portion, but with additional character "a". Each composing element of the left eye portion has a same function as the corresponding composing element of the right eye portion. The left eye portion and the right eye portion need not have all the composing elements. For example, the control unit 105 may be disposed only for the right eye portion, and the control unit 105a may not be disposed for the left eye portion, so that the control unit 105 of the right eye portion simultaneously controls the display for both the right eye and the left eye. In this case, the number of components of the display device is decreased, and the cost and weight of the display device can be reduced.

Description hereinbelow is based on the assumption that the control unit 105 of the right eye portion also controls the light source 101a, the spatial modulation element 103a and the like of the left eye portion. In the following description, even when only the spatial modulation element 103 is mentioned on which to display a diffraction pattern, it is assumed that the diffraction pattern is also displayed on the spatial modulation element 103a, unless otherwise specified.

The distance denoted with the reference numeral 121 in FIG. 2 indicates a distance from the assumed eyeball position of the user (pupil center 193 in this embodiment, as described above) to the reflecting mirror 104, and the distance denoted with the reference numeral 122 in FIG. 2 indicates a distance from the reflecting mirror 104 to the spatial modulation element 103. In this description, the sum of the distance 121 and the distance 122 is called a distance (or an optical axis distance) from the assumed eyeball position to the spatial modulation element 103.

Figure 3:
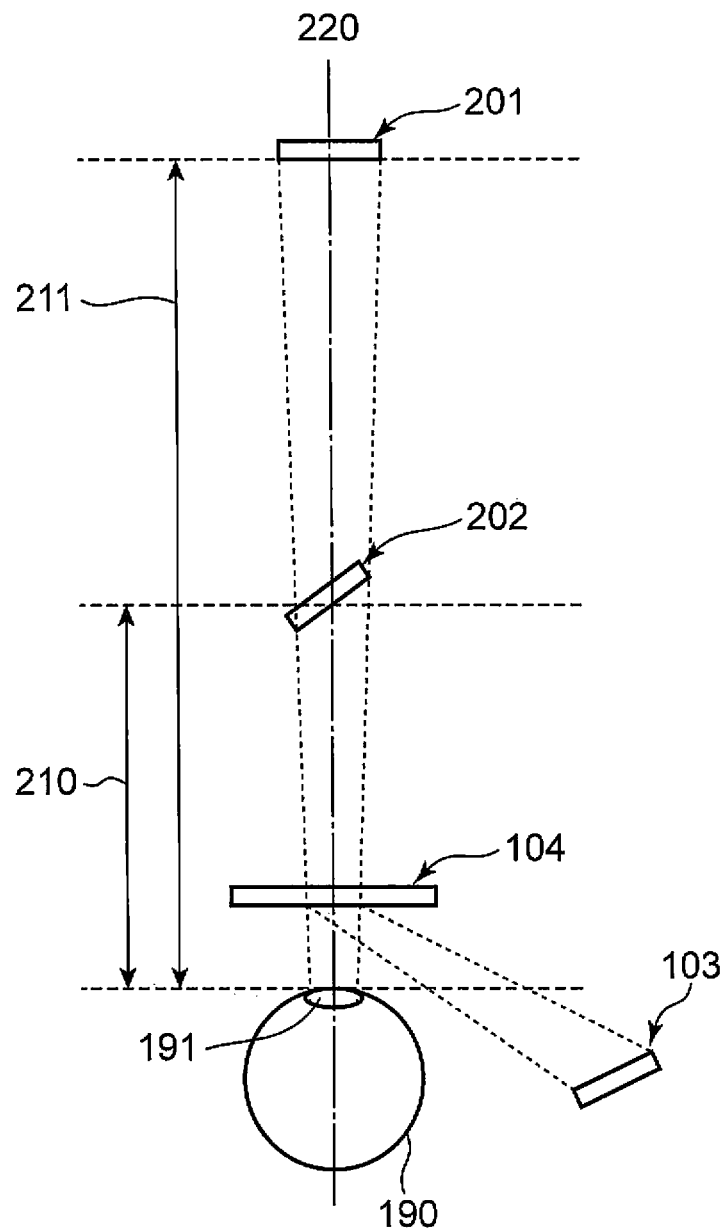
Figure 4:
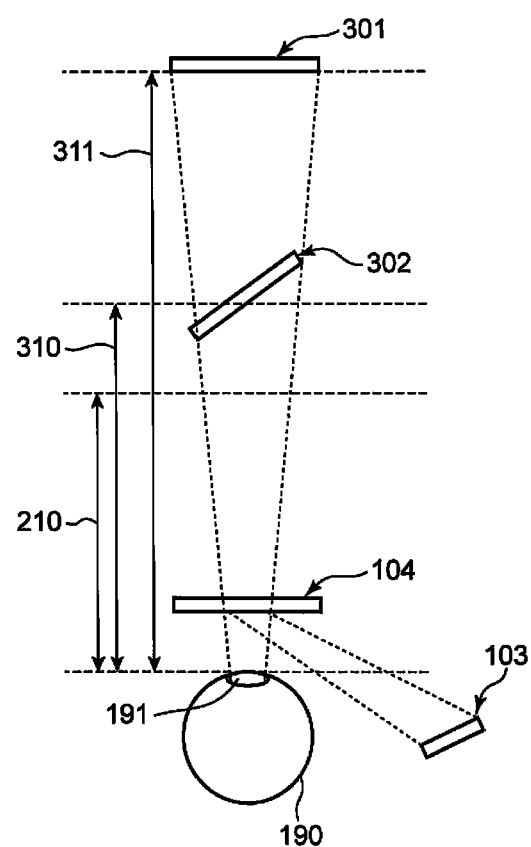

FIG. 3 and FIG. 4 are diagrams depicting a positional relationship of the eyeball 190, the reflecting mirror 104, the spatial modulation element 103, a reconstructed image (fictive image) generated by a diffraction pattern, and the like.

The eyeball 190, the reflecting mirror 104 and the spatial modulation element 103 are disposed as shown in FIG. 3. In a case where the optical magnification of the reflecting mirror 104 is "1", a virtual image 202 of the spatial modulation element 103 is located at a position shown in FIG. 3. The distance from the pupil center of the eyeball 190 to the virtual image 202 is equal to the "distance 210 up to the spatial modulation element 103", that is, a sum of the distance 121 from the pupil center of the eyeball 190 to the reflecting mirror 104 and the distance 122 from the reflecting mirror 104 to the spatial modulation element 103. In the example in FIG. 3, the spatial modulation element 103 is diagonally disposed with respect to the optical axis 220, and the distance in this case is a distance based on the center point of the spatial modulation element 103 as a reference point. A point other than the center may be used as the reference point.

In a case where the optical magnification of the reflecting mirror 104 is greater than "1" as shown in FIG. 4, a virtual image 302 of the spatial modulation element 103 is located at a position shown in FIG. 4. The distance 310 from the pupil center of the eyeball 190 to the virtual image 302 of the spatial modulation element 103 is longer than the above-mentioned "distance 210 up to the spatial modulation element 103", and the virtual image 302 is larger than the virtual image 202.

Figure 22A:
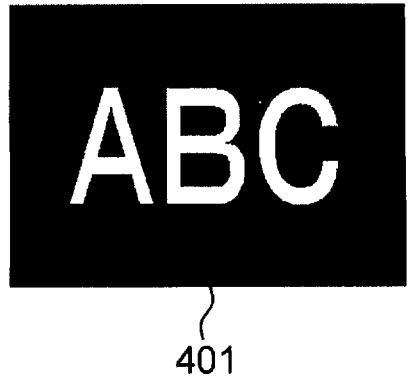
FIG. 22A shows an example of an original image.
Figure 22B:
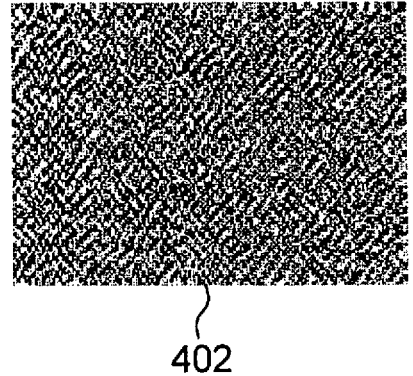
FIG. 22B shows an example of a diffraction pattern generated from the original image.
Figure 23:
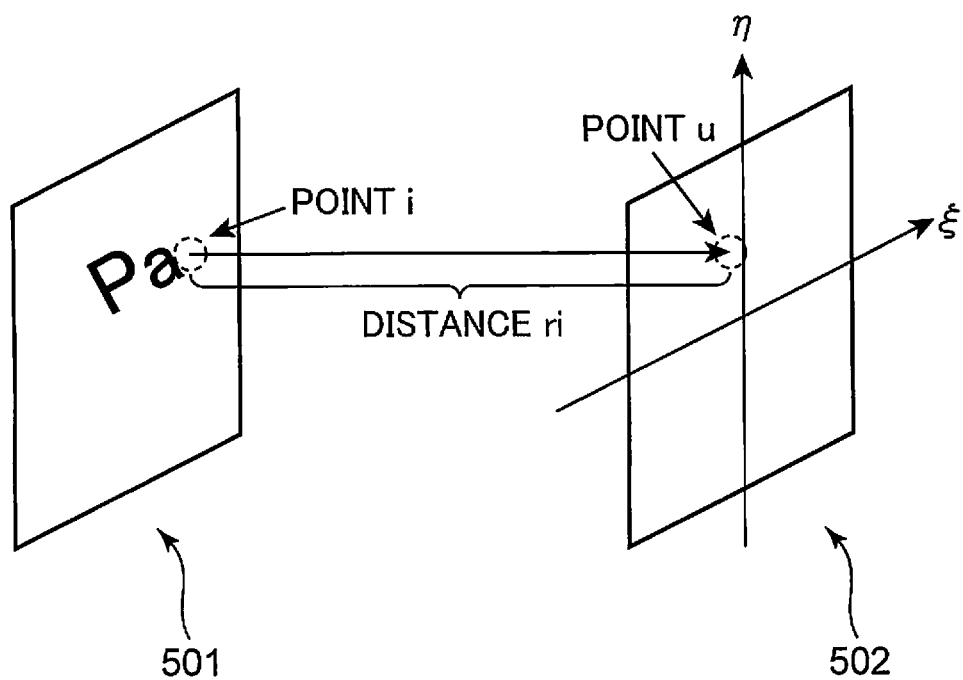
FIG. 23 shows an example of the positional relationship between an original image and a liquid crystal panel that displays a diffraction pattern on generateing the diffraction pattern.

By displaying a diffraction pattern (e.g. the diffraction pattern 402 shown in FIG. 22B) on the spatial modulation element 103, the user can visually recognize the fictive image 201 in FIG. 3 and the fictive image 301 in FIG. 4 (e.g. the original image (fictive image) 401 shown in FIG. 22A). The distance 211 or 311 up to the fictive image can be changed by computation of the diffraction pattern. Therefore, the distance from the eyeball 190 to the fictive image can be appropriately adjusted according to the visual acuity of the user.

By displaying a diffraction pattern on the spatial modulation element 103 using the CGH type display device 1 shown in FIG. 1 and FIG. 2 in this way, a fictive image can be generated at a position far from the eyeball 190 of the user without increasing the size of the illumination optical system 102 or the like.

However, in order to generate a diffraction pattern to be displayed on the spatial modulation element 103 as described above, computation based on the original image to be displayed to the user is required. In a case where the cost of computation is high, time to generate and display one diffraction pattern becomes long. As a result, in the case of displaying a moving image, a frame rate of the moving image may drop.

In order to handle this problem, in the present embodiment, the control unit 105 controls the generation of a diffraction pattern according to the state of the display device and the peripheral state of the user. Thereby the computation cost for generating a diffraction pattern is reduced, and a drop in image quality of a fictive image displayed to the user is suppressed. In Embodiment 1, in a case where the computation cost required for generating the diffraction pattern is high, the size of the diffraction pattern is reduced. This example will be described with reference to FIG. 5 and FIG. 6.

Figure 5:
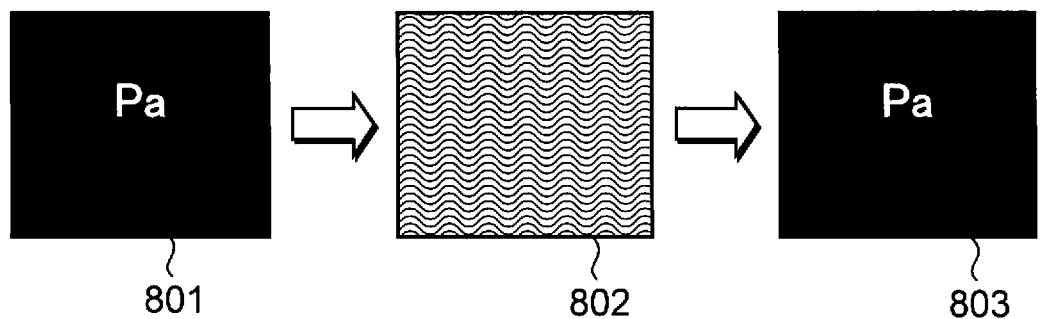
FIG. 5 shows an example of a display when the size of a diffraction pattern is not reduced.

FIG. 5 shows an example of a CGH type display when the size of a diffraction pattern is not reduced. The diffraction pattern 802 is generated from an original image 801, and the diffraction pattern 802 is displayed on the spatial modulation element 103. Thereby a reconstructed image (fictive image) 803 can be displayed to the user.

Figure 6:
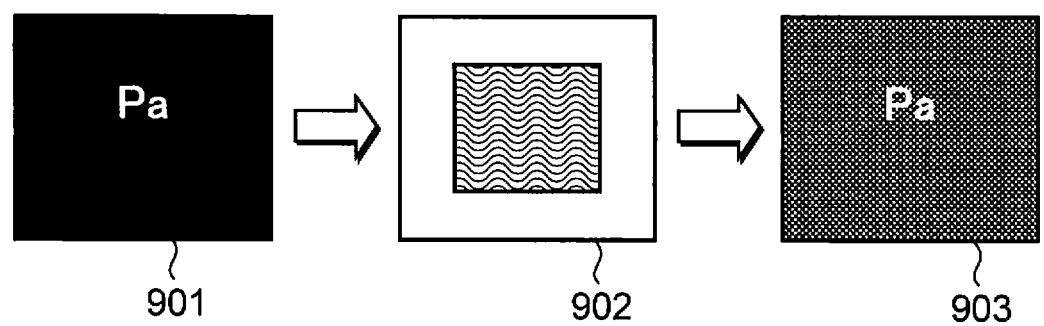
FIG. 6 shows an example of a display when the size of a diffraction pattern is reduced.

FIG. 6 shows an example of a display when the size of a diffraction pattern is reduced. In the example of FIG. 6, a diffraction pattern 902 is generated from an original image 901, just like FIG. 5, but the size of the diffraction pattern 902 is smaller than the size of the diffraction pattern 802.

In the examples of FIG. 5 and FIG. 6, the diffraction pattern 902 is the same as a center portion extracted from the diffraction pattern 802. By displaying this diffraction pattern 902 on the spatial modulation element 103, the reconstructed image (fictive image) 903 can be displayed to the user. At this time, the reconstructed image 903 has more noise compared with the reconstructed image 803. FIG. 6 shows an example when white floaters are generated as a noise on the entire screen. The original image 801 or 901 corresponds to an example of the original image data.

Thus, in the CGH method, only a part (diffraction pattern 902) of a diffraction pattern 802 can be computed and displayed on the spatial modulation element 103, thereby a reconstructed image can be displayed to the user. As a result, the computation amount can be reduced. However, in a case where a size of a diffraction pattern to be used is small, there arises a possibility that noise is included in the reconstructed image. Therefore, the computation cost that is allowed for computing the diffraction pattern and the allowable amount of noise included in the reconstructed image must be controlled to be appropriate. Now a concrete example of generating and controlling a diffraction pattern will be described with reference to FIG. 1 and FIG. 7.

Figure 7:
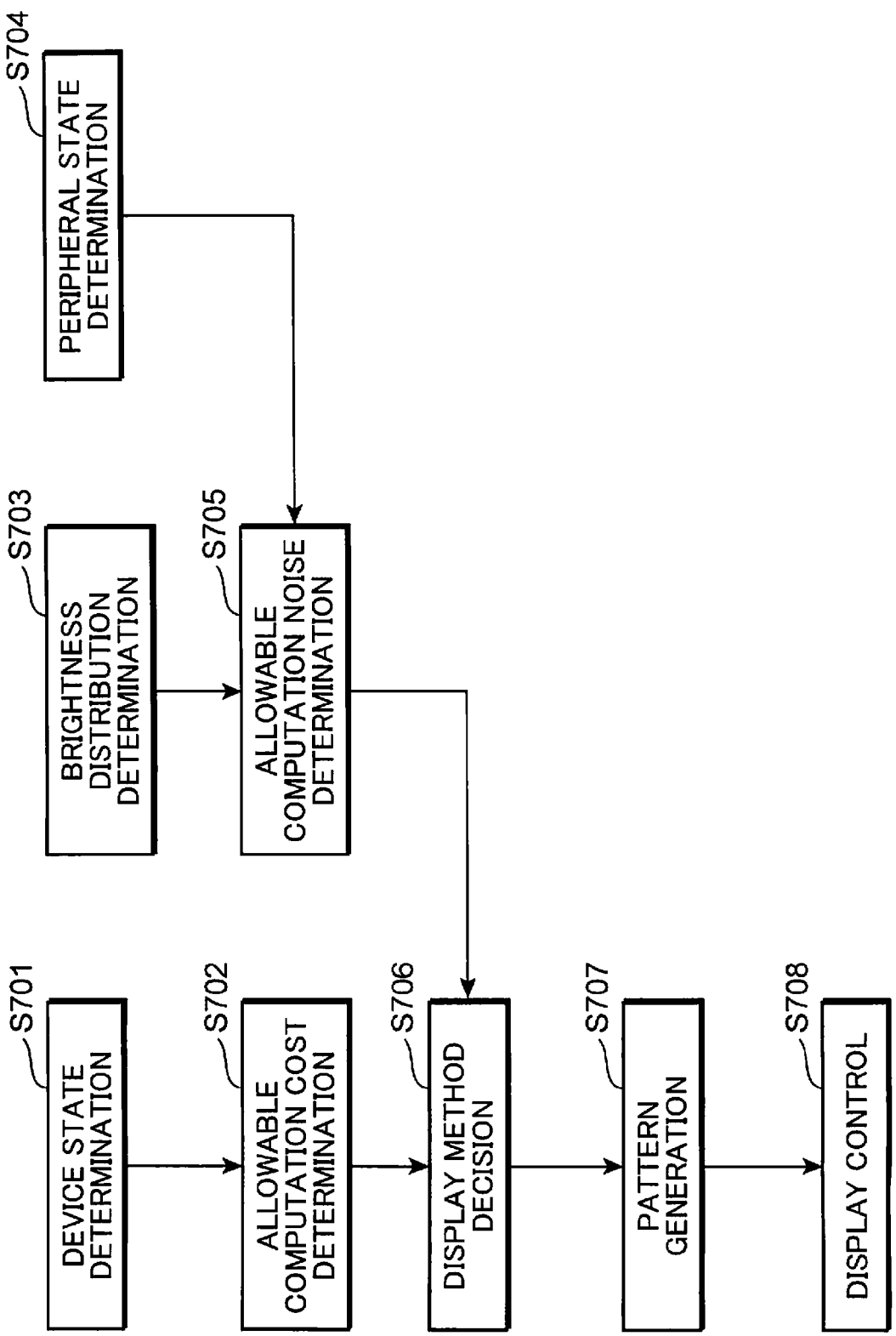
FIG. 7 is a flow chart depicting a procedure executed by each functional block of the CPU of the control unit shown in FIG. 1 according to Embodiment 1.

FIG. 7 is a flow chart depicting a procedure executed by each functional block of the CPU 11 of the control unit 105 shown in FIG. 1 in Embodiment 1. Each functional block of the CPU 11 shown in FIG. 1 controls the generation and display of a diffraction pattern by executing the processing in steps S701 to S707 shown in FIG. 7.

(Step S701: Device State Determination)

In this step S701, the device state acquisition unit 601 acquires information on the state of the display device. In this embodiment, the device state acquisition unit 601 acquires a remaining amount of the battery 106 and a CPU utilization ratio of the CPU 11. Generally as the computation cost (such as computing amount) for generating a diffraction pattern increases, consumption of the battery 106 increases and the CPU utilization ratio of the CPU 11 during computation increases. Therefore, in Embodiment 1, the device state acquisition unit 601 acquires these information, and notifies the allowable computation cost determination unit 602 of the acquired information, in order to determine a computation cost that can be used for computing the diffraction pattern.

(Step S702: Allowable Computation Cost Determination)

In step S702, the allowable computation cost determination unit 602 included in the display control unit 606 determines an allowable computation cost, which can be allowed in generating a diffraction pattern, based on the device state information which the device state acquisition unit 601 acquired in step S701. In this embodiment, the computation cost is an index to indicate a load applied to the battery 106 and the CPU 11 when a diffraction pattern is generated. The allowable computation cost is an index to indicate an amount of computation resources of the battery 106 and the CPU 11 that can be used for computing a diffraction pattern. As a numeric value of the allowable computation cost becomes greater, the allowable computation cost determination unit 602 determines that more computation resources and computation time can be spent in generating a diffraction pattern. The allowable computation cost determination unit 602 holds an allowable computation cost determination table for determining an allowable computation cost based on the information on the device state.

FIG. 8 shows an example of an allowable computation cost determination table according to this embodiment. In the example in FIG. 8, the allowable computation cost determination unit 602 computes the value of allowable individual cost for the battery 106 and the CPU 11 respectively, based on the values of the remaining amount of the battery 106 and the CPU utilization ratio of the CPU 11 acquired in step S701. According to this embodiment, the allowable computation cost determination unit 602 determines the allowable computation cost by applying the numerical values of the determined allowable individual cost and the allowable maximum cost shown in FIG. 8 to the computation formula given by Expression (4). The allowable computation cost determined by the allowable computation cost determination unit 602 is used by the display control unit 606.

$$\text{Allowable computation cost} = (\text{total of allowable individual cost})/\text{allowable maximum cost} \quad (4)$$

In this embodiment, the allowable computation cost determination unit 602 determines the allowable computation cost using the allowable computation cost determination table in a tabular form shown in FIG. 8, but may determine the allowable computation cost using a different method. For example, a function to output the allowable computation cost is defined using the information to indicate the device state as a variable, and the allowable computation cost determination unit 602 determines the allowable computation cost using this function. In this case, the allowable computation cost can be determined in more detail.

In this embodiment, the allowable computation cost determination unit 602 uses the computation formula of Expression (4) when the allowable computation cost is determined from the allowable individual cost, but a different formula may be used. For example, the allowable computation cost determination unit 602 may use a computation formula which multiplies the allowable computation cost of the CPU utilization ratio of the CPU 11, which causes a major influence on the computation speed, by a predetermined coefficient (e.g. a value greater than 1). In this case, the allowable computation cost can be estimated considering the degree of load on each computation resource upon generating a diffraction pattern.

(Step S703: Brightness Distribution Determination)

In this step S703, the image determination unit 603 determines the brightness distribution of the original image to be displayed to the user.

In the case of the CGH type display, it is known that noise, referred to as a computation noise and a quantization noise, are generated. The generation amount of this noise tends to increase as more high brightness pixels are included in the original image based on which a diffraction pattern is generated. FIGS. 9A and 9B show an example of this.

FIG. 9A shows an example of a reconstructed image (fictive image) when the number of high brightness pixels is small in the brightness distribution of an original image. FIG. 9B shows an example of a reconstructed image (fictive image) when the number of high brightness pixels is large in the brightness distribution of an original image.

A display example 1301 in FIG. 9A shows an example of a diffraction pattern 1304 and a reconstructed image 1305, in the case of using an original image 1303 of which the number of high brightness pixels is small. A display example 1302 in FIG. 9B shows an example of a diffraction pattern 1307 and a reconstructed image 1308, in the case of using an original image 1306 of which the number of high brightness pixels is large. As the reconstructed images 1305 and 1308 show, noise included in the reconstructed image increases and the entire image looks more whitish as a ratio of high brightness pixels (white pixels in the case of FIG. 9A and FIG. 9B) included in the original image is larger.

In this embodiment, the brightness distribution of the original image is used as information for estimating the noise generated in the reconstructed image. Therefore, the image determination unit 603 notifies the allowable computation noise determination unit 605 of the determined brightness distribution data of the image.

(Step S704: Peripheral State Determination)

In this step S704, the peripheral state acquisition unit 604 acquires information on peripheral brightness as the peripheral state of the user.

In this embodiment, the display device 1 is a spectacle type as shown in FIG. 2, and the display of an image to the user is performed with a see-through display where the display image by CGH and the outside image seen through the spectacles are superposed and displayed. In the case of the see-through display, the user tends to visually recognize noise of the image displayed by CGH less, as the peripheral brightness becomes higher. For example, in the display example 1302 in FIG. 9B, the reconstructed image 1308 displayed to the user has a lot of noise, and the background portion of the characters becomes whitish. However, in a case where the peripheral brightness of the user is high (bright such as outdoors during daylight), whitish background is less conspicuous.

In this embodiment, the information on the peripheral brightness is used as information for estimating how much noise, generated in the reconstructed image, that the user can allow. Therefore, the peripheral state acquisition unit 604 measures the peripheral brightness of the user using the brightness sensor 13 provided in the display device 1, and notifies the allowable computation noise determination unit 605 of the result.

In this embodiment, the brightness sensor 13 is disposed in the center part (part between the eyebrows of the spectacles) of the front portion 112 (FIG. 2). This makes it possible to measure the brightness in the line of sight of the user, without diminishing the design feature of the display device 1. The present invention however is not limited to this, and the brightness sensor 13 may be installed in any location of the display device 1. The display device 1 may have a plurality of brightness sensors. In this case, the peripheral state (peripheral brightness) of the user can be measured more accurately.

In embodiment, the peripheral state acquisition unit 604 uses the information on the peripheral brightness as the peripheral state of the user, but may use other information. The peripheral state acquisition unit 604 may use something other than a brightness sensor to acquire the peripheral brightness. The peripheral state acquisition unit 604 may also acquire information from a GPS or wireless LAN for example, to determine whether the user is indoors or outdoors, and estimate the brightness based on this determination result. In this case, the number of sensors required by the display device 1 can be reduced.

(Step S705: Allowable Computation Noise Determination)

In step S705, the allowable computation noise determination unit 605 included in the display control unit 606 determines the allowable computation noise which is allowed when the reconstructed image is displayed by the CGH method, based on the information on the brightness distribution of the image acquired in step S703 and the peripheral state of the user acquired in step S704. In this embodiment, the computation noise is a noise included in the reconstructed image when a diffraction pattern is displayed on the spatial modulation element 103, as described above. In this embodiment, the allowable computation noise is an index to indicate the amount of the computation noise that is allowed by the user. The allowable computation noise determination unit 605 holds an allowable computation noise determination table for determining the allowable computation noise based on the brightness distribution of the image and the information on the peripheral state of the user.

FIG. 10 shows an example of the allowable computation noise determination table according to the present embodiment. In the example in FIG. 10, the allowable computation noise determination unit 605 computes the value of an allowable individual noise for the brightness distribution and the peripheral brightness respectively based on the value of the brightness distribution of the image acquired in step S703 and the value of the peripheral brightness acquired in step S704.

The high brightness distribution ratio included in FIG. 10 indicates a ratio of pixels having higher brightness than a predetermined threshold value (e.g. an intermediate brightness value between white display and black display) among the brightness values of the pixels included in the image. The threshold value may be brightness "127" for example, in a case where the brightness is expressed in 8-bits. In this case, the brightness "127" corresponds to an example of the reference brightness. In a case where the image is a binary image, the high brightness distribution ratio is a ratio of the white pixels to the entire image. In this case, the brightness "0" corresponds to an example of the reference brightness.

The peripheral brightness value included in FIG. 10 is determined by computing a ratio of an acquired value of the current peripheral brightness to a predetermined value (e.g. maximum brightness during daytime 1000 cd/m$^2$). In a case where the peripheral brightness of the user acquired in step S704 is 100 cd/m$^2$, for example, the peripheral brightness value is computed as 10%. Then the allowable individual noise for the peripheral state is determined as 50 in the table in FIG. 10. In FIG. 10, the peripheral brightness value 50% corresponds to an example of the reference value.

In this embodiment, the allowable computation noise determination unit 605 determines the allowable computation noise by applying the determined allowable individual noise and the numeric value of the allowable maximum noise shown in FIG. 10 to the computation formula shown in Expression (5). The allowable computation noise determined by the allowable computation noise determination unit 605 is used by the display control unit 606.

$$\text{Allowable computation noise} = (\text{total allowable individual noise})/\text{allowable maximum noise} \quad (5)$$

In this embodiment, the allowable computation noise determination unit 605 uses the allowable computation noise determination table in a tabular form shown in FIG. 10 for determining the allowable computation noise, but may use a different method for the determination. The allowable computation noise determination unit 605 may define a function of outputting the allowable computation noise using the information to indicate the peripheral state as a variable, for example, and perform the determination of the allowable computation noise using the function. In this case, the allowable computation noise determination unit 605 can determine the allowable computation noise in more detail.

(Step S706: Display Method Decision)

In step S706, the display control unit 606 determines a method for displaying an image to the user based on the values of the allowable computation cost determined in step S702 and the allowable computation noise determined in step S705.

In this embodiment, the display control unit 606 reduces a diffraction pattern in a case where the allowable computation cost is low. Thereby the time required for generating the diffraction pattern is suppressed, and a drop in the frame rate is prevented. In a case where the display control unit 606 determines that the computation noise, due to reducing the diffraction pattern, exceeds the amount of the computation noise allowed by the user, the display control unit 606 drops the frame rate without reducing the diffraction pattern.

Figure 11:
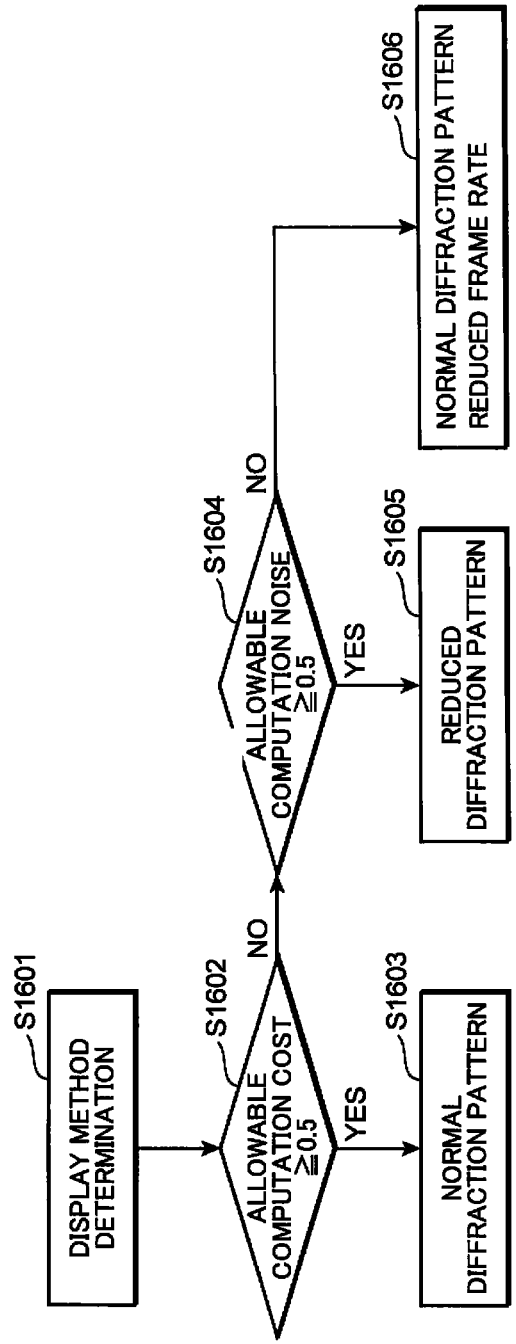
FIG. 11 is a flow chart depicting a procedure example for the display control unit to determine reducing the diffraction pattern and dropping the frame rate according to Embodiment 1.

FIG. 11 is a flow chart depicting a procedure example for the display control unit 606 to determine a reduction the diffraction pattern and a drop of the frame rate. The display control unit 606 starts to determine a display method for the user based on the allowable computation cost determined by the allowable computation cost determination unit 602, and the allowable computation noise determined by the allowable computation noise determination unit 605 (step S1601).

First the display control unit 606 determines a display method using the allowable computation cost (step S1602). In a case where the value of the allowable computation cost is a predetermined value (0.5 in the case of the example in FIG. 11) or more, the display control unit 606 determines that the diffraction pattern need not be reduced (step S1603). In a case where the allowable computation cost is less than the predetermined value, the display control unit 606 determines that it is necessary to reduce the diffraction pattern or drop the frame rate, and then determines a display method using the allowable computation noise (step S1604).

In a case where the value of the allowable computation noise is the predetermined value (0.5 in the case of the example in FIG. 11) or more, the display control unit 606 determines that the computation noise generated due to reducing the diffraction pattern is allowed, by the user, and determines to reduce the diffraction pattern (step S1605). In a case where the value of the allowable computation noise is less than the predetermined value, the display control unit 606 does not reduce the diffraction pattern. In this case, generation of the diffraction pattern may take time, so the display control unit 606 determines dropping the frame rate of the image to be displayed to the user (step S1606). The display control unit 606 executes step S707 to generate the diffraction pattern, according to the result of executing the determination flow in FIG. 11.

The display control unit 606 may determine a display method according to a method other than the flow chart shown in FIG. 11. For example, the threshold value of the allowable computation cost in step S1602 and the threshold value of the allowable computation noise in step S1604 may be different values. In this case, the display control unit 606 can perform a processing such as making a determination while attaching greater importance to the allowable computation cost.

(Step S707: Diffraction Pattern Generation)

In step S707, the diffraction pattern generation unit 607 generates a diffraction pattern from the original image data to indicate the original image to be displayed to the user, based on the determination result in step S706.

In a case where the diffraction pattern is not reduced as a result of determination in step S706, the diffraction pattern generation unit 607 generates a diffraction pattern according to the display size of the spatial modulation element 103, from the original image data to indicate the original image, as shown in FIG. 5.

In a case where the diffraction pattern is reduced, the diffraction pattern generation unit 607 uses a smaller size than the display size of the spatial modulation element 103 (that is, a part of the diffraction pattern in FIG. 5) as the size of the diffraction pattern, as shown in the example in FIG. 6, whereby the computation cost required for generating the diffraction pattern is reduced.

The diffraction pattern generation unit 607 notifies the display control unit 606 of the generated diffraction pattern. The display control unit 606 performs the processing in step S708 in order to display the diffraction pattern on the spatial modulation element 103.

The method for generating the diffraction pattern by the diffraction pattern generation unit 607 is not limited to a specific method, but may be an arbitrary computation method. For example, the diffraction pattern generation unit 607 may generate a diffraction pattern by applying the computation formulas of Expressions (1) to (3) after adding the phase distribution data to the original image data. With this method, a virtual image with a good three-dimensional effect can be generated. The diffraction pattern generation unit 607 may generate a diffraction pattern by performing an inverse Fourier transform on the result of adding the phase distribution data to the original image data. With this method, faster computation can be performed.

Further computation processing may be performed on the computation result of the computation formulas using Expressions (1) to (3) (hereafter "point filling method") or an inverse Fourier transform. In this case, correction of an aberration of the optical system and other processings can be performed.

In the case of computing a diffraction pattern based on the computation formulas of Expressions (1) to (3), the order of the computation cost required for computing the diffraction pattern is O (MX×MY×NY×NY), where MX×MY is a resolution of the diffraction pattern, and NX×NY is a size of the reconstructed image. Therefore, when the size of the diffraction pattern is reduced to half horizontally and vertically, the computation amount required for the diffraction pattern can be reduced to ¼.

In the case of generating a diffraction pattern by performing approximation for the computation formulas of Expressions (1) to (3), and performing an inverse Fourier transform on the original image data, the order of computation cost required for computing the diffraction pattern is 0 (NlogN× NlogN), when the resolution of the diffraction pattern is N×N. In this case, the computation cost can be suppressed to ¼ by reducing the size of the diffraction pattern to half.

For reduction of the diffraction pattern, the diffraction pattern generation unit 607 may use a method that is different from a method of computing only the center portion of the normal diffraction pattern (e.g. method shown in FIG. 6).

FIG. 12 shows examples of a diffraction pattern of which size is reduced. The diffraction pattern 1001 in FIG. 12 is an example of generating only the left or right half of the normal diffraction pattern. The diffraction pattern 1002 in FIG. 12 is an example of generating only pixels in odd columns or even columns of the normal diffraction pattern. The diffraction pattern 1003 in FIG. 12 is an example of generating only pixels in odd rows or even rows of the normal diffraction pattern. The diffraction pattern 1004 in FIG. 12 is an example of generating only the top half or bottom half of the normal diffraction pattern.

In FIG. 12, the diffraction patterns 1003 and 1004 can maintain the viewing angle in the horizontal direction, since the range of the horizontal direction is not reduced. Therefore the diffraction patterns 1003 and 1004 are more desirable than the diffraction patterns 1001 and 1002. In the diffraction pattern 1003, the computation areas are separated, but the diffraction pattern 1004 has only one computation area. Therefore the diffraction pattern 1004 is more desirable than the diffraction pattern 1003.

The number of pixels of the diffraction pattern to be generated is decreased compared with the normal diffraction pattern as shown in FIG. 6 and FIG. 12, whereby the computation cost can be effectively reduced, particularly in the case of generating the diffraction pattern using the point filling method algorithm.

In this embodiment, the display control unit 606 acquires the original image data for generating the diffraction pattern from the image determination unit 603, but may obtain the original image data by a different method. For example, the display control unit 606 may acquire only information to indicate the storage position of the original image data from the image determination unit 603, and acquire the original image data from the server on the network. In this case, the cost of the display device 1 can be reduced since it is unnecessary to store the original image data inside the display device 1.

(Step S708: Diffraction Pattern Display)

In step S708, the display control unit 606 displays the diffraction pattern generated in step S707 on the spatial modulation element 103. In this embodiment, the spatial modulation elements 103a and 103 are provided for the left and right eyes respectively, so a display image can be displayed for both eyes of the user by displaying an identical diffraction pattern on the spatial modulation elements 103a and 103 respectively.

In this embodiment, the spatial modulation element 103 displays the phase information of the diffraction pattern computed in step S707, whereby the reconstructed image is displayed. Since the computation result of Expressions (1) to (3) and the computation result of the inverse Fourier transform, for example, are complex amplitude data, the spatial modulation element 103 can function as a spatial modulation element phase type hologram by displaying only the phase information of each pixel.

In a case where the spatial modulation element 103 can display only predetermined phases (e.g. in a case of a ferroelectric liquid crystal that can represent only two values of phase 0 and phase π), the reconstructed image can be displayed by quantizing the phase of each pixel (e.g. matching a value with either phase 0 or phase π).

In Embodiment 1, the spatial modulation element 103 corresponds to an example of the first spatial modulation element, the spatial modulation element 103a corresponds to an example of the second spatial modulation element, the CPU 11 corresponds to an example of the computing unit, and the allowable computation cost determination unit 602 corresponds to an example of the cost determination unit.

According to Embodiment 1, a diffraction pattern to be displayed to the user can be controlled considering the state of the display device 1 and the peripheral state of the display device 1 by executing the processings in steps S701 to S708 described above.

Figure 13A:
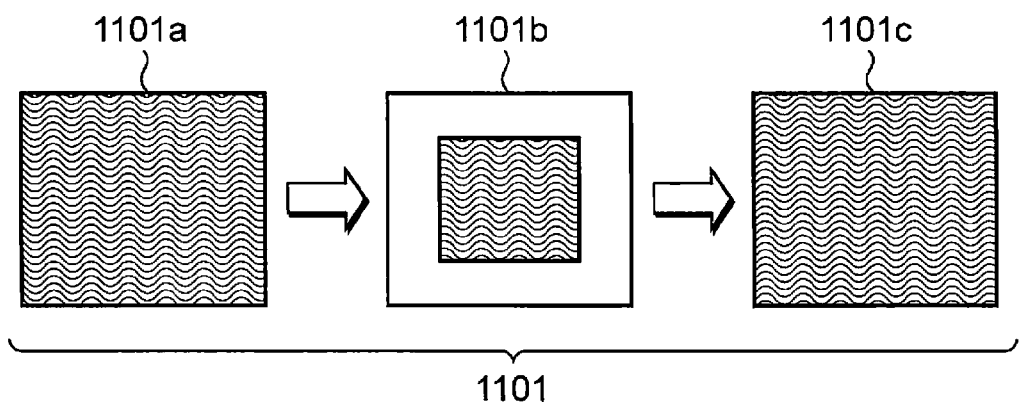
FIG. 13A shows an example of a change of display of a diffraction pattern.
Figure 13B:
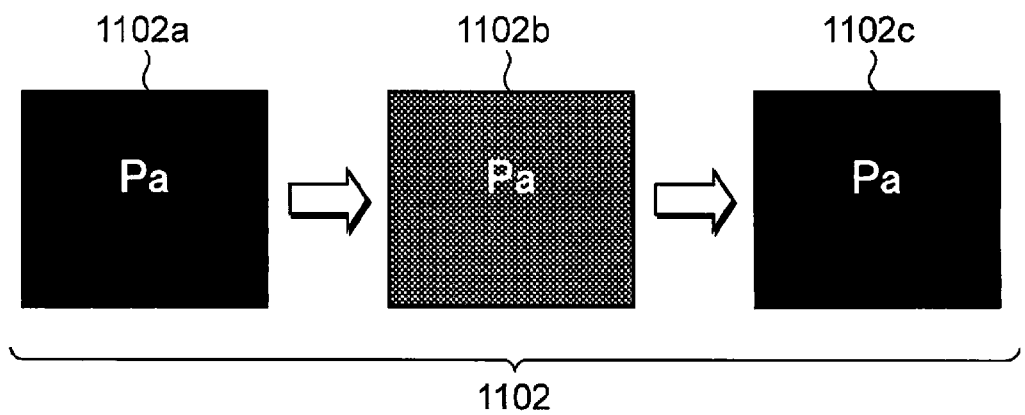
FIG. 13B shows an example of a change of a reconstructed image caused by the change in FIG. 13A.

FIG. 13A shows an example of the changes of display of a diffraction pattern. FIG. 13B shows an example of the change of a reconstructed image caused by the change in FIG. 13A. The diffraction pattern sequence 1101 in FIG. 13A shows a change of a diffraction pattern displayed on the spatial modulation element 103. When the diffraction pattern 1101a or 1101c is displayed, the diffraction pattern is not reduced since the display device has enough computation resources. The size is reduced only when the display device does not have enough computation resources, as shown in the diffraction pattern 1101b.

The reconstructed image sequence 1102 in FIG. 13B exemplifies reconstructed images corresponding to the diffraction pattern sequence 1101. In the case of the reconstructed images 1102a and 1102c when the diffraction pattern is not reduced, noise is not generated much, and in the case of the reconstructed image 1102b when the diffraction pattern is reduced, noise is generated. By displaying the diffraction patterns as shown in FIGS. 13A and 13B, a drop in the frame rate of the reconstructed image to be displayed to the user can be prevented. As a result, a drop in the image quality of the reconstructed image to be displayed to the user can be suppressed.

Modified Embodiment of Embodiment 1

In above Embodiment 1, an example in which the display control unit 606 displays an identical diffraction pattern on both of the spatial modulation elements 103a and 103 for the left and right eyes is shown, but the display control unit 606 may display different diffraction patterns for the left and right eyes. In this case, a stereoscopic display can be performed by displaying parallax images for the left and right eyes. The display control unit 606 may also adjust the display position of the reconstructed image by causing the diffraction pattern generation unit 607 to change the diffraction pattern to be generated according to the difference of the visual acuity of the left and right eyes of the user. This makes it possible for the user to view the reconstructed image more comfortably.

In the embodiment in which the display control unit 606 displays different diffraction patterns for the left and right eyes, the display control unit 606 may reduce the size of only one of the diffraction patterns for the left and right eyes.

Figure 14A:
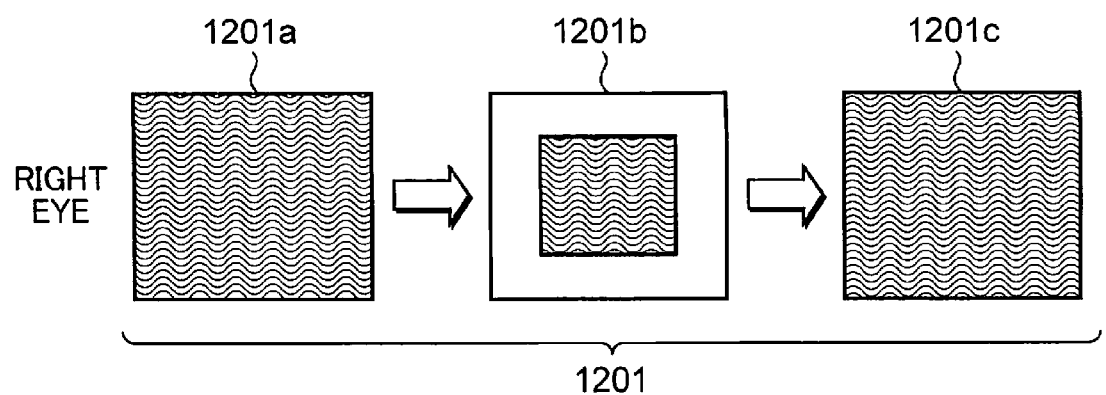
FIGS. 14A and 14B show an example when a size of a diffraction pastern displayed on a left spatial modulation element is different from that displayed on a right spatial modulation element.
Figure 14B:
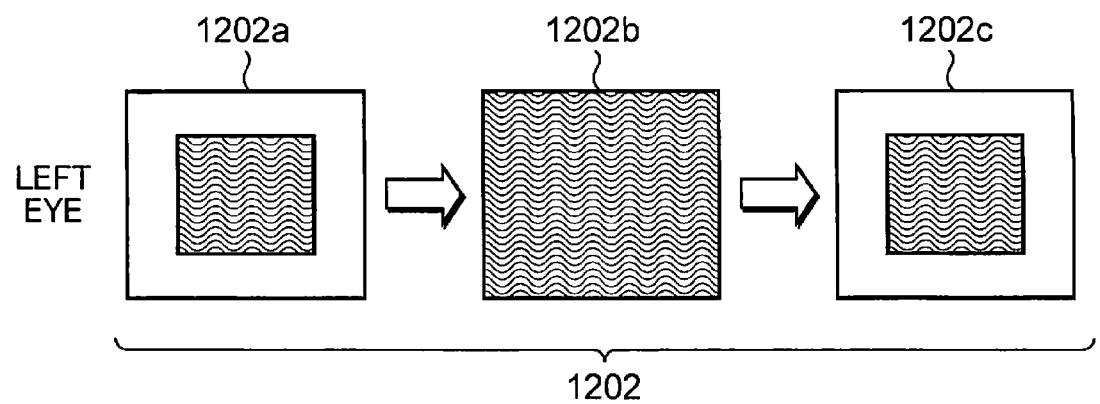

FIG. 14A and FIG. 14B show an example when a size of a diffraction pattern displayed on the left spatial modulation element 103a is different from that displayed on the right spatial modulation element 103. FIG. 14A is for the right eye, and FIG. 14B is for the left eye. The diffraction pattern sequence 1201 in FIG. 14A is an example showing a change of the diffraction pattern displayed for the right eye of the user, that is, a change of the diffraction pattern displayed on the spatial modulation element 103, and the diffraction patterns 1201a to 1201c are sequentially displayed. The diffraction pattern sequence 1202 in FIG. 14B is an example of showing a change of the diffraction pattern displayed for the left eye of the user, that is, a change of the diffraction pattern displayed on the spatial modulation element 103a, and the diffraction patterns 1202a to 1202c are sequentially displayed.

As shown in FIGS. 14A and 14B, the display control unit 606 controls display of the diffraction patterns in the spatial modulation elements 103 and 103a, so that a size of the diffraction pattern to be displayed is always different between the right eye and the left eye. By performing this kind of display, the computation cost for generating two diffraction patterns can be suppressed, and a reconstructed image with little noise can be displayed for at least one of the left and right eyes. In the embodiment shown in FIGS. 14A and 14B, the diffraction pattern 1201a corresponds to an example of the first diffraction pattern and the diffraction pattern 1202a corresponds to an example of the second diffraction pattern.

Figure 15A:
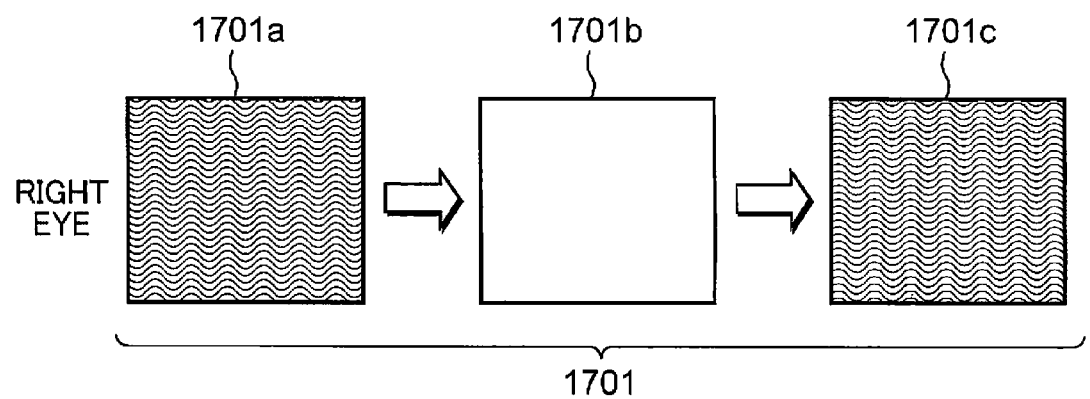
FIGS. 15A and 15B show an example when a diffraction pattern is alternately displayed on the left and right spatial modulation elements.
Figure 15B:
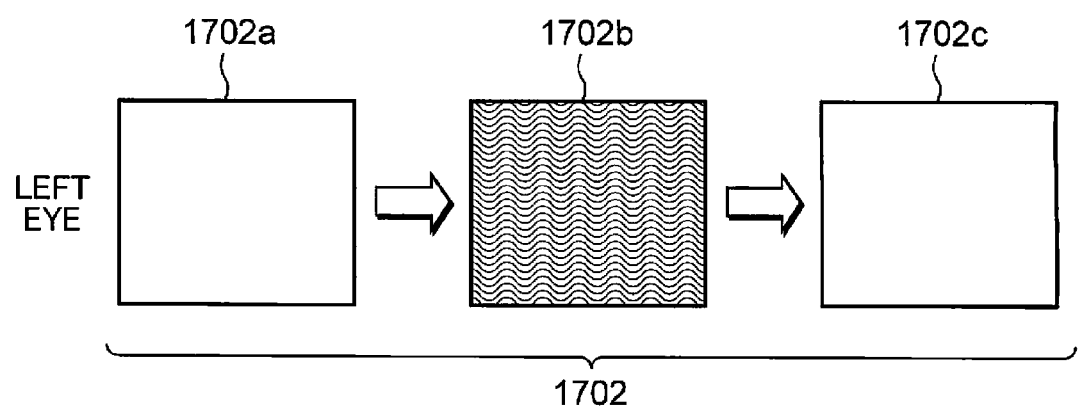

Instead of reducing the size of the diffraction patterns displayed for the left and right eyes as shown in FIGS. 14A and 14B, the display control unit 606 may display the diffraction pattern only for one of the left and right eyes. FIGS. 15A and 15B show this example.

FIGS. 15A and 15B show an example when a diffraction pattern is alternately displayed on the left and right spatial modulation elements 103a and 103. FIG. 15A is for the right eye, and FIG. 15B is for the left eye. The display content 1701 in FIG. 15A is an example showing a display content displayed for the right eye of the user, that is, a display content on the spatial modulation element 103, where a diffraction pattern 1701a, a blank 1701b and a diffraction pattern 1701c are sequentially displayed. The display content 1702 in FIG. 15B is an example showing a display content displayed for the left eye of the user, that is, a display content on the spatial modulation element 103a, where a blank 1702a, a diffraction pattern 1702b and a blank 1702c are sequentially displayed.

In the embodiment shown in FIGS. 15A and 15B, the display control unit 606 alternately displays a diffraction pattern on the spatial modulation element 103 for the right eye and the spatial modulation element 103a for the left eye. This makes it possible to reduce the computation cost for all diffraction patterns to be displayed for the left and right eyes to half. In the embodiment shown in FIGS. 15A and 15B, the diffraction pattern 1701a or 1701c corresponds to an example of the first diffraction pattern, and the diffraction pattern 1702b corresponds to an example of the second diffraction pattern.

In Embodiment 1 above, two sizes of the diffraction pattern are used: the normal size as shown in the diffraction pattern 802 in FIG. 5, and half the normal size as shown in the diffraction pattern 902 in FIG. 6. However the size of the diffraction pattern may be changed finer according to the value of the allowable computation cost or the like. In this case, the display control with less computation noise becomes possible according to the state of the display device 1.

In Embodiment 1 above, an example in which a single spatial modulation element 103a or 103 is used for the left eye or the right eye respectively is shown, but a plurality of spatial modulation elements may be used for a single eye. In this case, a fictive image with higher resolution and a wider viewing angle can be displayed to the user.

Figure 16:
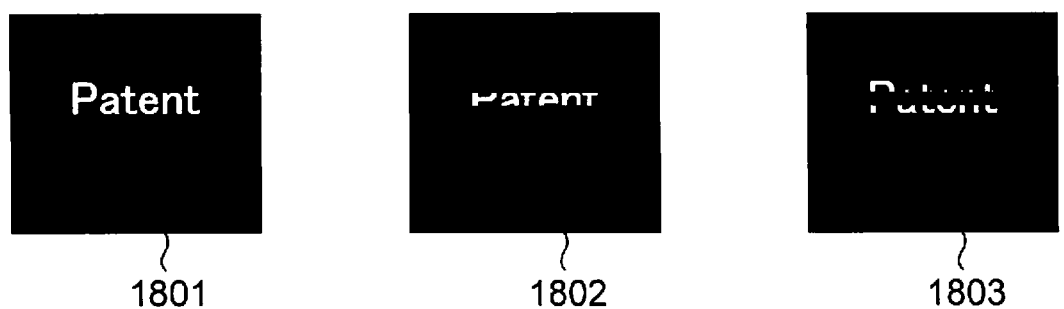
FIG. 16 shows an example when an original image is separated into an original image for a right eye and an original image for a left eye.

In Embodiment 1 above, the diffraction pattern is generated, attaching weight to the computation cost required for generating the diffraction pattern as shown in FIG. 11, but a control attaching weight to the computation noise may be performed. For example, when the value of the allowable computation noise is low, the original image is separated into the original image for the left eye and that for the right eye to be displayed, whereby the amount of computation noise to be generated can be reduced. FIG. 16 shows an example.

FIG. 16 shows an example in which an original image 1801 is separated into an original image for a right eye 1802 and an original image for the left eye 1803. In the original image 1801, in a case where the number of high brightness pixels (pixels of the white portion in the example in FIG. 16) is large, the diffraction pattern generation unit 607 separates the original image 1801 into the original image for the right eye 1802 and the original image for the left eye 1803. The diffraction pattern generation unit 607 generates a first diffraction pattern from the original image 1802, and the display control unit 606 displays the first diffraction pattern on the spatial modulation element 103 for the right eye. The diffraction pattern generation unit 607 generates a second diffraction pattern from the original image 1803, and the display control unit 606 displays the second diffraction pattern on the spatial modulation element 103a for the left eye. Thereby the amount of computation noise to be displayed to the user can be changed. In the embodiment shown in FIG. 16, the original image 1801 corresponds to an example of the original image data, the original image 1802 corresponds to an example of the first original image data, and the original image 1803 corresponds to an example of the second original image data.

In generating a diffraction pattern from the original image data, in general, the diffraction pattern generation unit 607 generates random phase distribution data, adds (superposes) the generated phase distribution data to the original image data to generate phase superposed image data, and generates the diffraction pattern from this phase superposed image data (the point filling method and the method using Fourier transform). At this time, different phase distribution data may be used for generating diffraction patterns to be displayed on the spatial modulation elements 103a and 103 for the left and right eyes respectively. According to this embodiment, noise sensed by the user, such as a speckle noise generated by using a laser beam for the output light of the light source 101, can be reduced. The phase distribution data need not be truly random, but can be substantially random.

In Embodiment 1 above, an example in which display control of a diffraction pattern is performed considering both the allowable computation cost and the allowable computation noise, but control may be performed based on only one of the allowable computation cost and the allowable computation noise. In this case, the functional block configuration of the CPU 11 of the control unit 105 can be simplified and the cost can be reduced. Furthermore a number of times of determining conditions can be reduced, so the diffraction pattern can be computed faster.

In Embodiment 1 above, the device state acquisition unit 601 acquires the remaining amount of the battery 106 and the CPU utilization ratio of the CPU 11 as the device state, but may acquire different information. For example, the device state acquisition unit 601 may acquire a utilization ratio of the memory 12. The allowable computation cost determination unit 602 may determine the allowable individual cost based on the utilization ratio of the memory 12 acquired by the device state acquisition unit 601. In this embodiment, the memory 12 corresponds to an example of the storage unit. According to this embodiment, the allowable computation cost can be determined in more detail.

In Embodiment 1 above, the configuration in which the image determination unit 603 is a function of the CPU 11 included in the control unit 105 is described, but the image determination unit 603 may be separated from the control unit 105. For example, the configuration may be such that the control unit 105 is included in the main unit of the display device 1 and the image determination unit 603 is included in a mobile terminal which performs wireless communication with the display device 1. In this case, the display device 1 can be lighter, and the display device 1 can be mounted on the user more comfortably.

In Embodiment 1 above, the image determination unit 603 uses the data on the brightness distribution as the information for estimating the computation noise, but different information may be used. For example, the image determination unit 603 may simply calculate the number of pixels other than black pixels, and notify the allowable computation noise determination unit 605 of this data. The number of pixels other than black pixels can be the number of pixels of which signal levels are "1" to "255" in a case where a black pixel is represented by a signal level of "0" in 8-bits. In this embodiment, the signal level "0" corresponds to an example of the reference brightness. According to this embodiment, the volume of information the image determination unit 603 treats can be reduced.

Embodiment 2

In Embodiment 1 above, an example in which the control unit 105 is housed inside the display device 1 is described, but a part of the functions of the CPU 11 of the control unit 105, such as the diffraction pattern generation unit 607, may be disposed in an external terminal as necessary.

Figure 17:
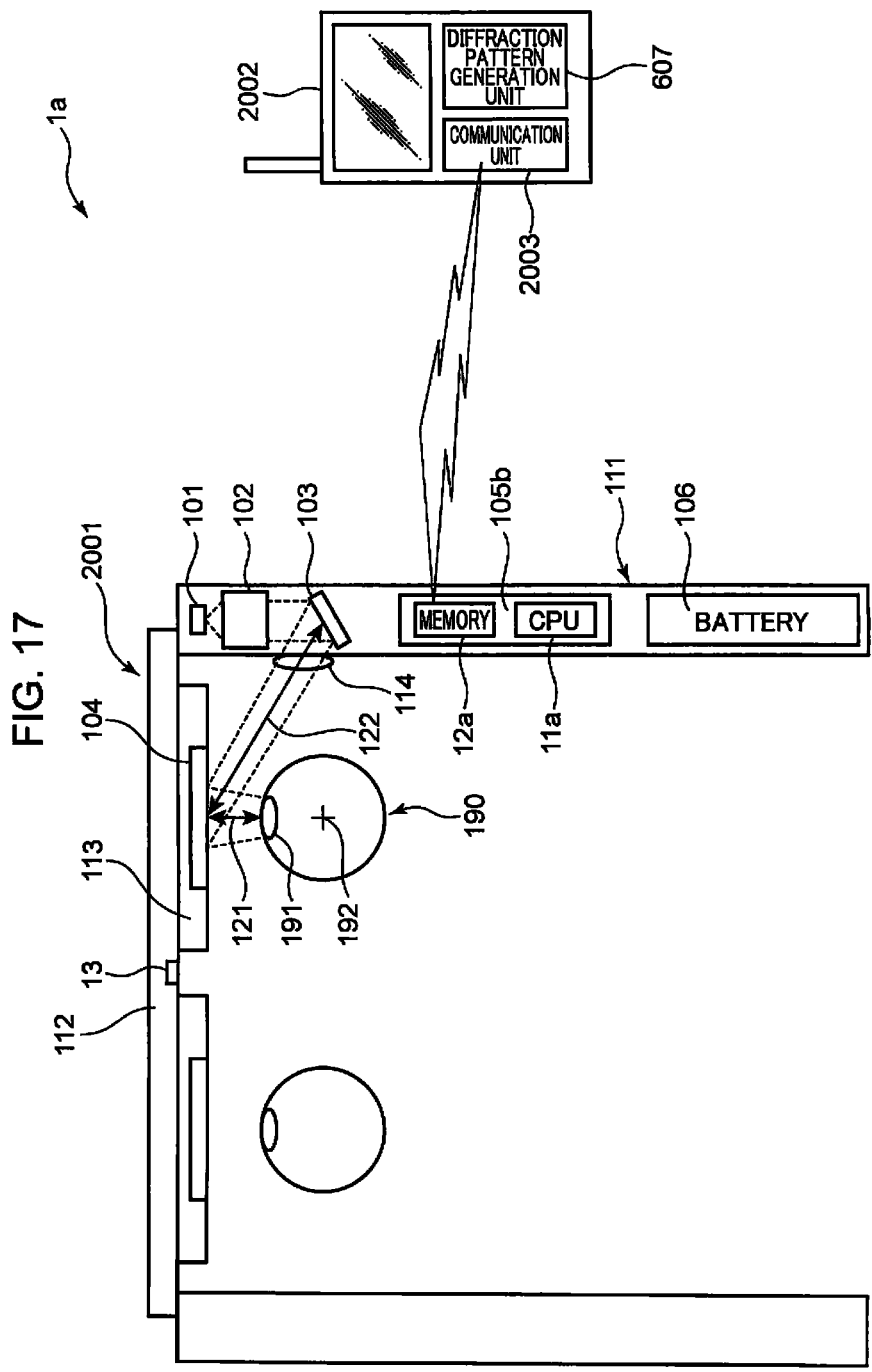
FIG. 17 is a schematic diagram depicting a configuration of a display device according to Embodiment 2.
Figure 18:
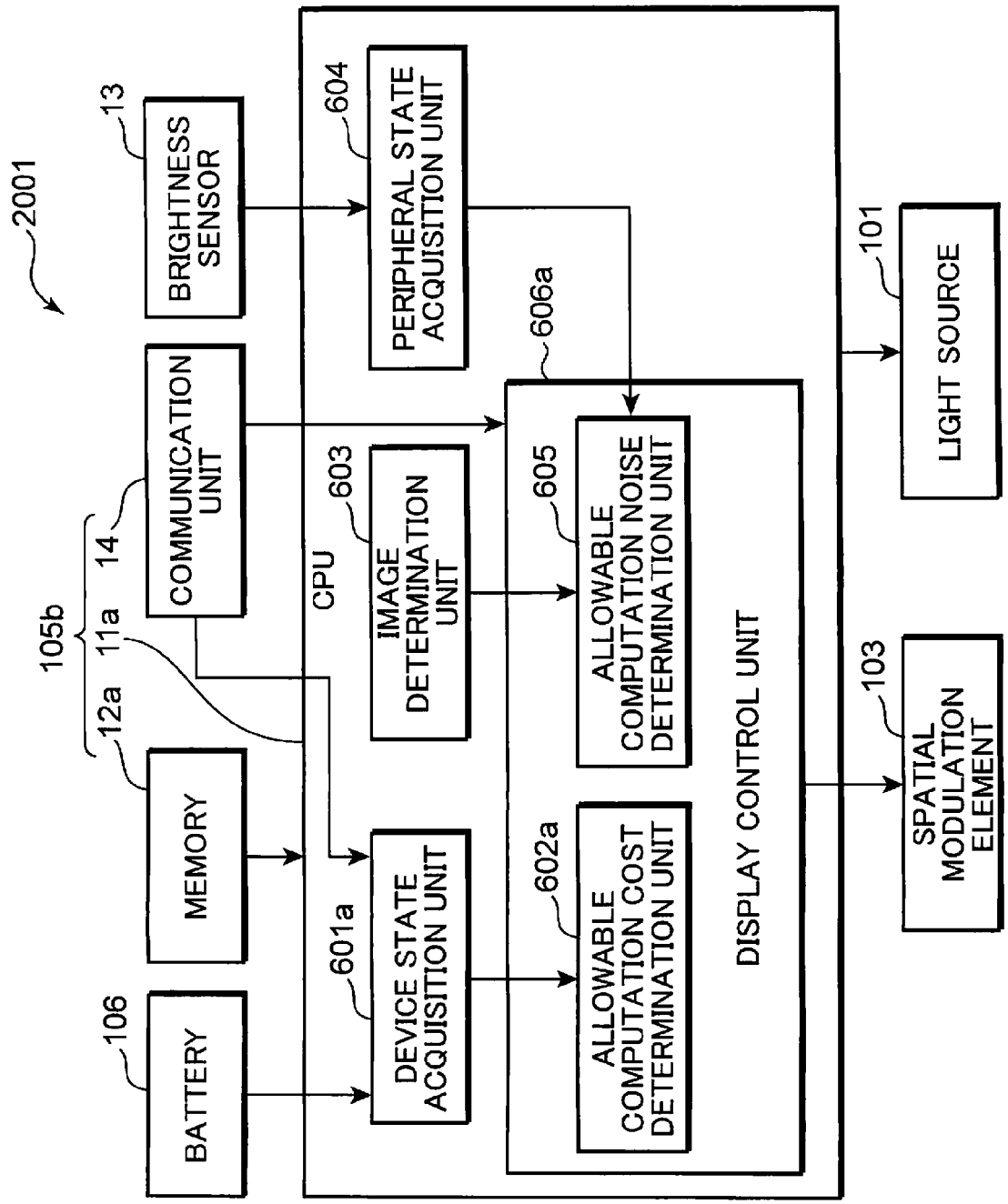
FIG. 18 is a functional block of a main unit shown in FIG. 17.

FIG. 17 is a schematic diagram depicting a configuration of a display device 1a according to Embodiment 2. FIG. 18 is a functional block diagram of a main unit 2001 shown in FIG. 17. FIG. 19 shows an example of an allowable computation cost determination table according to Embodiment 2. A composing element the same as Embodiment 1 shown in FIG. 1 and FIG. 2 is denoted with a same reference symbol. In FIG. 17, an illustration of the configuration for the left eye is omitted. Embodiment 2 will be described focusing mainly on the differences from Embodiment 1.

As FIG. 17 shows, the display device 1a includes a main unit 2001 and a mobile terminal 2002. The main unit 2001 has a control unit 105b instead of the control unit 105 in the display device 1 of Embodiment 1. The other configuration of the main unit 2001 is the same as the display device 1 of Embodiment 1 shown in FIG. 1 and FIG. 2.

The control unit 105b of the main unit 2001 has a CPU 11a instead of the CPU 11, a memory 12a instead of the memory 12, and newly has a communication unit 14 in the display device 1 shown in FIG. 1 and FIG. 2. As a functional block, the CPU 11a includes a device state acquisition unit 601a, an image determination unit 603, a peripheral state acquisition unit 604 and a display control unit 606a. The display control unit 606a includes an allowable computation cost determination unit 602a and an allowable computation noise determination unit 605. Programs are stored in the memory 12a. Data is also stored temporarily in the memory 12a. The CPU 11a implements each of the above described functional blocks by executing programs stored in the memory 12a.

The mobile terminal 2002 has a diffraction pattern generation unit 607 for performing the CGH type display control, and a communication unit 2003 for communicating with the main unit 2001. The diffraction pattern generation unit 607 generates a diffraction pattern just like Embodiment 1 described above. The communication unit 2003 transmits the diffraction pattern generated by the diffraction pattern generation unit 607 to the main unit 2001.

The communication unit 14 of the main unit 2001 receives a diffraction pattern transmitted from the communication unit 2003 of the mobile terminal 2002. The communication unit 14 notifies the display control unit 606a of the received diffraction pattern.

The device state acquisition unit 601a of the CPU 11a has a function similar to the device state acquisition unit 601 of Embodiment 1. The device state acquisition unit 601a further acquires information on the communication band of the communication unit 14. In Embodiment 2, the allowable computation cost determination unit 602a holds an allowable computation cost determination table shown in FIG. 19.

In Embodiment 2, a size of a diffraction pattern which the communication unit 2003 of the mobile terminal 2002 can transmit to the communication unit 14 increases or decreases depending on the communication band of the communication unit 14. Therefore the allowable computation cost determination unit 602a determines the allowable computation cost from the value of the communication band of the communication unit 14 using the allowable computation cost determination table shown in FIG. 19. In a case where the communication speed drops, the display control unit 606a instructs the diffraction pattern generation unit 607, via the communication unit 14, to reduce the size of the diffraction pattern to be generated.

The diffraction pattern generation unit 607 generates a diffraction pattern of which size is reduced, responding to an instruction from the display control unit 606a. The communication unit 2003 of the mobile terminal 2002 transmits the diffraction pattern with a reduced size, generated by the diffraction pattern generation unit 607, to the communication unit 14. The display control unit 606a displays the diffraction pattern with a reduced size, received by the communication unit 14, on the spatial modulation element 103. As a result, even when the communication speed drops, the diffraction pattern can be displayed on the spatial modulation element 103 without dropping the frame rate. In Embodiment 2, the allowable computation cost determination unit 602a corresponds to an example of the cost determination unit.

According to Embodiment 2, the number of components required for the spectacle type main unit 2001 can be reduced, and the capacity required for the battery 106 can be decreased. As a result, a spectacle type main unit 2001, which is light and which can be easily mounted, can be implemented.

In Embodiment 2 above, only the functional block of the diffraction pattern generation unit 607 in the CPU 11 of Embodiment 1 is disposed in the mobile terminal 2002, but the present invention is not limited to this. In addition to the diffraction pattern generation unit 607, other functional blocks of the CPU 11a may also be disposed in the mobile terminal 2002. Thereby the weight of the main unit 2001 can be further decreased, and the user can be more comfortable when the main unit 2001 is mounted. It is preferable, however, that the peripheral state acquisition unit 604 is included in the main unit 2001, since the peripheral state acquisition unit 604 has a function to acquire the peripheral state of the main unit 2001.

In Embodiment 2 above, a diffraction pattern is generated in the mobile terminal 2002, which can perform wireless communication with the main unit 2001, but the present invention is not limited to this. For example, a diffraction pattern may be generated using a server on a network which can perform wireless communication with the main unit 2001. In this embodiment as well, the calculation resources required for the main unit 2001 can be reduced, so that cost can be decreased and weight can be decreased, just like the above-described Embodiment 2.

Embodiment 3

In Embodiment 3, an example of suppressing noise of the reconstructed image by generating a plurality of diffraction patterns from one original image will be described. The configuration of the head mounted display device (HMD) in Embodiment 3 is the same as Embodiment 1 shown in FIG. 1 and FIG. 2, hence detailed description on the configuration of the display device is omitted, and necessary description is made with reference to FIG. 1.

Figure 20:
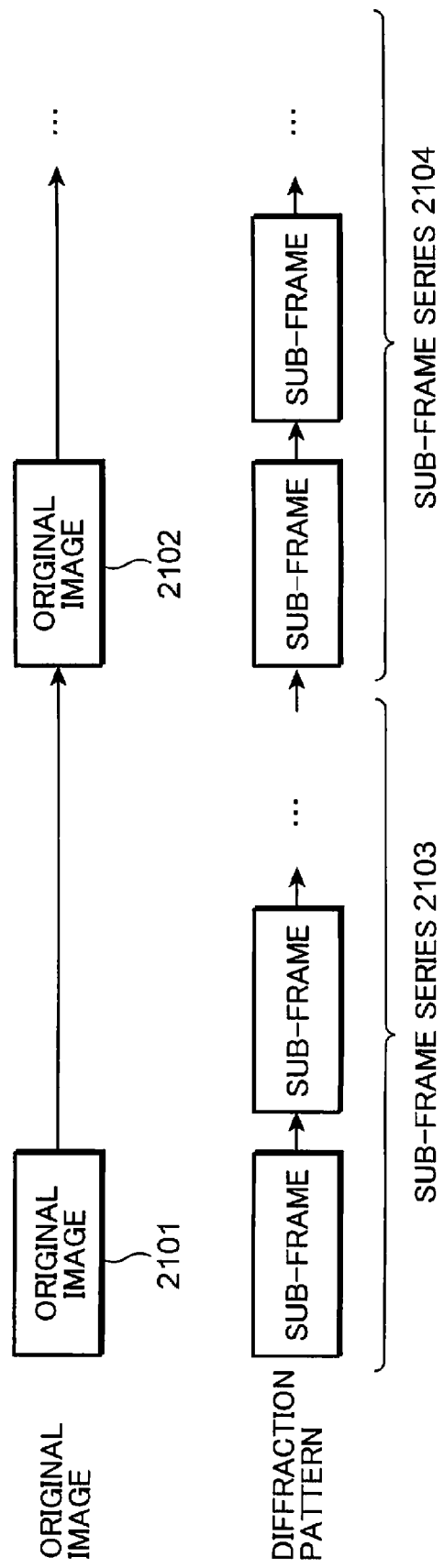
FIG. 20 is a diagram depicting Embodiment 3 of the present invention which generates a plurality of diffraction patterns from an original image.

In the case of a display based on CGH, as shown in Embodiment 1, the diffraction pattern generation unit 607 generates a diffraction pattern from an original image, the display control unit 606 displays the generated diffraction pattern on the spatial modulation element 103, and the light from the light source 101 illuminates the diffraction pattern, whereby a reconstructed image is formed. In Embodiment 1, since the laser light source is used for the light source 101, noise called speckles is generated in the reconstructed image. To prevent this, two or more diffraction patterns are generated from one original image in Embodiment 3. FIG. 20 shows this example.

FIG. 20 is a diagram depicting Embodiment 3 of the present invention, which generates a plurality of diffraction patterns from an original image. FIG. 20 shows an example in which an original image 2101 and an original image 2102 are sequentially displayed as an image to be displayed to the user. In the CGH method, a diffraction pattern is generated from an original image in order to display an image to the user. In Embodiment 3, the diffraction pattern generation unit 607 generates a plurality of diffraction patterns from one original image. In this description, the diffraction patterns generated from one original image are also called "sub-frames", and a set of the diffraction patterns is also called a "sub-frame sequence".

In the example in FIG. 20, a sub-frame sequence 2103 constituted by a plurality of diffraction patterns (sub-frames) is generated from the original image 2101, and a sub-frame sequence 2104 constituted by a plurality of diffraction patterns (sub-frames) is generated from the original image 2102. The display control unit 606 causes the spatial modulation element 103 to display the sub-frame sequences 2103 and 2104, whereby the original images 2101 and 2102 can be displayed to the user.

At this time, the diffraction pattern generation unit 607 generates each diffraction pattern as the diffraction pattern in the sub-frame sequences 2103 and 2104 so that a different speckle pattern is generated. Thereby the speckle noise is made uniform, and speckle noise recognized by the eyes of the user can be suppressed.

The method the diffraction pattern generation unit 607 generates each diffraction pattern (sub-frame) so that different speckle patterns are generated, is not required to be limited to a specific method, and an arbitrary method can be used. For example, the diffraction pattern generation unit 607 may provide different phase distribution data to each pixel of the original image in each sub-frame in generating the diffraction patterns. In this embodiment, since each sub-frame generates a different speckle pattern, the speckle noise can be suppressed when the display of the sub-frames is switched at high-speed. In this embodiment, the diffraction pattern generation unit 607 calculates the diffraction patterns to be generated for each sub-frame.

Figure 21B:
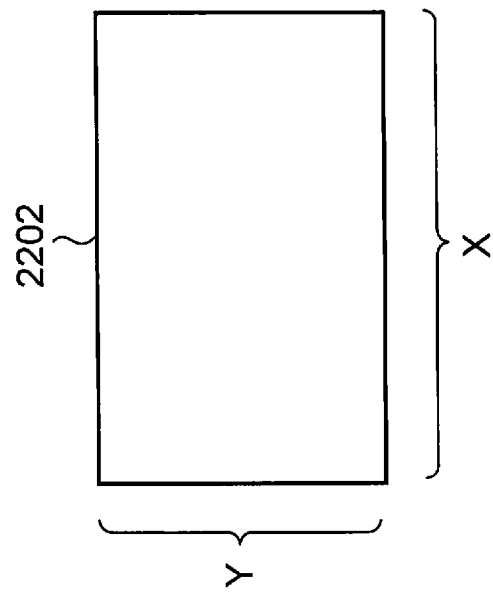
FIG. 21B shows a size of a diffraction pattern displayed on the spatial modulation element.
Figure 21A:
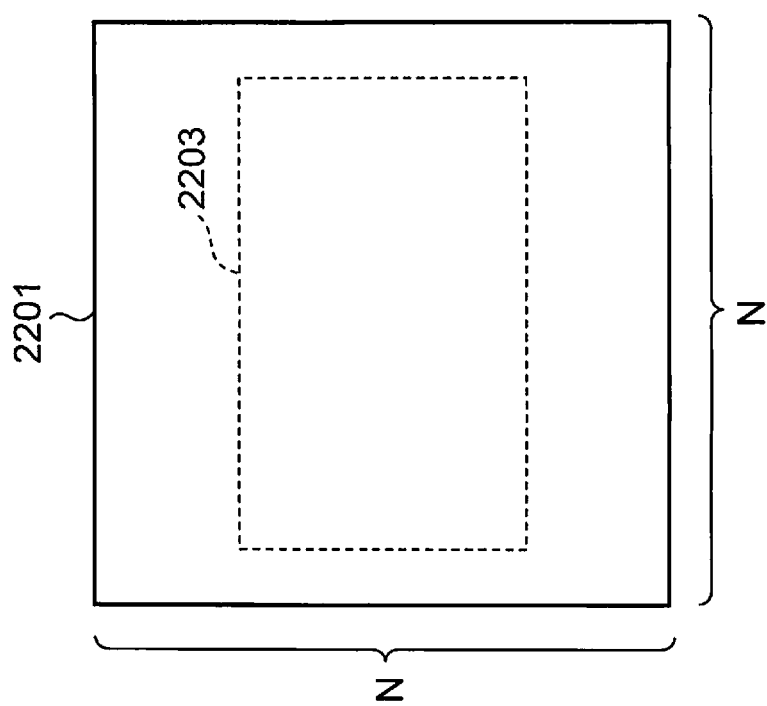
FIG. 21A shows a size of a basic diffraction pattern generated from an original image.

A basic diffraction pattern of which size is bigger than the size of the spatial modulation element 103 may be generated, and each sub-frame may be constructed by extracting a different area of the basic diffraction pattern. FIGS. 21A and 21B show this example.

FIG. 21A shows a size of a basic diffraction pattern 2201 generated from an original image. FIG. 21B shows a size of a diffraction pattern (sub-frame) 2202 to be displayed on the spatial modulation element 103. As FIG. 21A shows, the number of pixels of the basic diffraction pattern 2201 is N×N. As FIG. 21B shows, the number of pixels of the sub-frame 2202 is X×Y. Here, X<N and Y<N.

In the case of performing a Fourier transform using a high-speed algorithm (fast Fourier transform: FFT), the value of N is generally limited to a power of 2. However, the resolution of the spatial modulation element 103 is not a power of 2 in many cases. For example, SVGA is (800×600). Therefore, the diffraction pattern generation unit 607 adjusts the original image to a size of a power of 2, and provides random phase distribution data to each pixel, and then performs an inverse Fourier transform to generate a basic diffraction pattern. Thereby the diffraction pattern generation unit 607 can generate the diffraction pattern at high-speed using an FFT.

Further, the size of the basic diffraction pattern 2201 is set to be bigger than the size of the spatial modulation element 103 by setting X<N and Y<N. Hence the sub-frame 2202 to be displayed on the spatial modulation element 103 can be generated by extracting a part (e.g. an area 2203 enclosed by a dotted line in FIG. 21A) from the basic diffraction pattern 2201. Therefore, the diffraction pattern generation unit 607 generates each sub-frame of the sub-frame sequence corresponding to the original image by extracting a different area of the basic diffraction pattern 2201. Thereby each sub-frame can be a different diffraction pattern, and a different speckle pattern can be generated in each sub-frame.

In this embodiment, a plurality of sub-frames can be generated by performing an inverse Fourier transform on the original image only once. Accordingly, a computation amount required for generating the sub-frame sequence can be suppressed.

In Embodiment 3 above, the display control unit 606 may change the number of sub-frames to be generated according to the computation cost allowed by the display device.

In Embodiment 3 above, in the case of using a method of extracting the sub-frame sequence from the basic diffraction pattern, as described with reference to FIG. 21A and FIG. 21B, the diffraction pattern generation unit 607 may perform additional computation processing on the extracted sub-frames. For example, the diffraction pattern generation unit 607 may add a spherical wave pattern for correcting a display position of a virtual image (fictive image). Further, the diffraction pattern generation unit 607 may add phase distribution data for correcting an optical system aberration, for example. According to this embodiment, the image quality of the fictive image to be displayed can be improved while suppressing the computation amount for generating sub-frames.

A part of each function of the display device 1 and the like shown in each embodiment described above may be implemented by a device that is different from the main body of the display device 1 and the like. Further, a function not shown in each embodiment described above may be included in the display device 1 and the like. As described in Embodiment 2 above, functions may be divided into the main body of the display device 1 and the like, and a mobile terminal that is separate from the main body of the display device 1 and the like. Functions may also be separated into the display device 1 and the like, and a network server.

In Embodiment 1 above, the control unit 105 of the display device 1 computes a diffraction pattern, and in Embodiment 2 above, the main unit 2001 of the display device 1a acquires a diffraction pattern calculated in the mobile terminal 2002, which is an external device. But the embodiments are not limited to these. An external device may perform a part of the computation of a diffraction pattern, and the display device 1 and the like may perform the remainder of the computation.

In each embodiment described above, the light source 101 may be disposed in an external device, and the light outputted from the light source 101 may be transmitted via an optical fiber. The battery 106 may be disposed in an external device, and a power cord may be connected to the display device 1. Further, the display device 1 and the like may include a camera, various sensors for angular velocity, temperature, GPS or the like, an input device such as a switch, and an output device such as a speaker, as other functions.

In this description, the size of a diffraction pattern may be referred to as a resolution in displaying the diffraction pattern on the spatial modulation element 103, a file size of the diffraction pattern, or a ratio of an area to display the interference fringes in the entire diffraction pattern, or a combination thereof.

The above described embodiments are just examples, and can be modified in various ways within a scope not departing from the true spirit of the invention.

The specific embodiments described above mainly include the invention configured as described below.

A display device according to an aspect of the present invention comprises: a light source that outputs a laser beam; an illumination optical system that emits illumination light of the laser beam; a diffraction pattern generation unit that generates a diffraction pattern from original image data; a spatial modulation element that diffracts the illumination light by displaying the diffraction pattern; and a display control unit that performs at least one of a change in a display timing of a diffraction pattern the spatial modulation element displays and a change in a size of a diffraction pattern the diffraction pattern generation unit generates.

According to this configuration, the light source outputs a laser beam. The illumination optical system emits illumination light of the laser beam. The diffraction pattern generation unit generates a diffraction pattern from the original image data. The spatial modulation element diffracts the illumination light by displaying the diffraction pattern. The display control unit performs at least one of a change in a display timing of a diffraction pattern the spatial modulation element displays and a size of a diffraction pattern the diffraction pattern generation unit generates. For example, when a diffraction pattern for a right eye and a diffraction pattern for a left eye are displayed alternately, with changing the display timing, the number of times of generating a diffraction pattern can be decreased, therefore the time required for computing diffraction patterns can be decreased. Further, for example, when a size of a diffraction pattern is decreased, the time required for computing a diffraction pattern can be decreased. In consequence, diffraction patterns can be suitably generated, and accordingly, a drop in the image quality of an image visually recognized by a user can be suppressed.

In the above display device, it is preferable that the spatial modulation element includes a first spatial modulation element that displays a first diffraction pattern for a right eye of a user, and a second spatial modulation element that displays a second diffraction pattern for a left eye of the user, and the diffraction pattern generation unit generates the first diffraction pattern and the second diffraction pattern so that the first diffraction pattern and the second diffraction pattern are different from each other.

According to this configuration, the first spatial modulation element displays a first diffraction pattern for the right eye of the user. The second spatial modulation element displays a second diffraction pattern for the left eye of the user. The diffraction pattern generation unit generates the first diffraction pattern and the second diffraction pattern so that the first diffraction pattern and the second diffraction pattern are different from each other. Therefore the user visually recognizes, with the left eye and the right eye, images based on the different diffraction patterns generated from the same original image data. Hence, by generating the first diffraction pattern and the second diffraction pattern so that parallax images are displayed for example, a very realistic image can be displayed.

In the above display device, it is preferable that the diffraction pattern generation unit generates random phase distribution data, generates the diffraction pattern from phase superposed image data in which the generated phase distribution data is superposed on the original image data, and changes phase distribution data to be used for generating the first diffraction pattern and for generating the second diffraction pattern.

According to this configuration, the diffraction pattern generation unit generates random phase distribution data. The diffraction pattern generation unit generates the diffraction pattern from phase superposed image data in which the generated phase distribution data is superposed on the original image data. The diffraction pattern generation unit changes phase distribution data to be used for generating the first diffraction pattern and for generating the second diffraction pattern. Therefore, the phase distribution data for the right eye and that for the left eye are different, and accordingly, the influence of speckle noise generated by using a laser beam can be reduced.

In the above display device, it is preferable that the diffraction pattern generation unit generates the first diffraction pattern and the second diffraction pattern of which sizes are different from each other.

According to this configuration, the diffraction pattern generation unit generates the first diffraction pattern and the second diffraction pattern of which sizes are different from each other. Therefore the computation amount of a diffraction pattern of which size is smaller, out of the first diffraction pattern and the second diffraction pattern, can be reduced. Further, out of the first diffraction pattern and the second diffraction pattern, a drop in image quality due to a diffraction pattern of which size is smaller can be suppressed by a diffraction pattern of which size is larger.

In the above display device, it is preferable that the diffraction pattern generation unit separates the original image data into first original image data for a right eye and second original image data for a left eye, generates the first diffraction pattern from the first original image data, and generates the second diffraction pattern from the second original image data.

According to this configuration, the diffraction pattern generation unit separates the original image data into first original image data for the right eye, and second original image data for the left eye. The diffraction pattern generation unit generates the first diffraction pattern from the first original image data. The diffraction pattern generation unit generates the second diffraction pattern from the second original image data. Accordingly, the computation amount required for computing the diffraction patterns can be reduced.

In the above display device, it is preferable that the display control unit alternately performs display of the first diffraction pattern by the first spatial modulation element, and display of the second diffraction pattern by the second spatial modulation element.

According to this configuration, the display control unit alternately performs display of the first diffraction pattern by the first spatial modulation element, and display of the second diffraction pattern by the second spatial modulation element. Accordingly, it is not necessary to simultaneously compute the first diffraction pattern for the right eye and the second diffraction pattern for the left eye. Thus, the computation amount of the diffraction patterns can be reduced.

In the above display device, it is preferable that the display device further comprises a device state acquisition unit that acquires at least one of information on a remaining amount of a battery for supplying power, information on a utilization ratio of a computing unit for performing computing including generation of a diffraction pattern by the diffraction pattern generation unit, information on a utilization ratio of a storage unit for storing data, and information on a communication band of a communication unit for communicating with an external device, wherein the display control unit changes a size of a diffraction pattern the diffraction pattern generation unit generates according to the information acquired by the device state acquisition unit.

According to this configuration, the device state acquisition unit acquires at least one of information on the remaining amount of the battery for supplying power, information on a utilization ratio of the computing unit for performing computing including generation of a diffraction pattern by the diffraction pattern generation unit, information on a utilization ratio of the storage unit for storing data, and information on a communication band of the communication unit for communicating with an external device. The display control unit changes a size of a diffraction pattern the diffraction pattern generation unit generates according to the information acquired by the device state acquisition unit. Therefore the computation cost required for generating a diffraction pattern can be adjusted considering the state of the display device.

In the above display device, it is preferable that the display control unit includes a cost determination unit that determines an allowable computation cost indicating computation resources that can be used for generating a diffraction pattern by the diffraction pattern generation unit, based on the information acquired by the device state acquisition unit, and the display control unit decreases a size of the diffraction pattern as a value of the allowable computation cost is smaller.

According to this configuration, the cost determination unit included in the display control unit determines an allowable computation cost indicating computation resources that can be used for generating a diffraction pattern by the diffraction pattern generation unit, based on the information acquired by the acquisition unit. The display control unit decreases the size of the diffraction pattern as the value of the allowable computation cost is smaller. Accordingly, load applied on the display device can be suppressed by decreasing the size of the diffraction pattern as the surplus of computation resources of the display device is less.

In the above display device, it is preferable that the display device further comprises an image determination unit that determines, based on the original image data, at least one of information on a brightness distribution that represents a brightness of each pixel in the original image data, and information on a number of pixels of which brightness exceeds a predetermined reference brightness among each pixel in the original image data, wherein the display control unit changes a size of a diffraction pattern the diffraction pattern generation unit generates according to the information determined by the image determination unit.

According to this configuration, the image determination unit determines, based on the original image data, at least one of information on a brightness distribution that represents a brightness of each pixel in the original image data, and information on the number of pixels of which brightness exceeds a predetermined reference brightness among each pixel in the original image data. The display control unit changes a size of a diffraction pattern the diffraction pattern generation unit generates according to the information determined by the image determination unit. More noise is generated as the number of high brightness pixels is larger in the original image data. Therefore the size of a diffraction pattern can be changed considering the noise to be generated by the original image data.

In the above display device, it is preferable that the display control unit increases a size of a diffraction pattern the diffraction pattern generation unit generates as a number of pixels of which brightness exceeds the reference brightness in the original image data is larger.

According to this configuration, the display control unit increases a size of a diffraction pattern the diffraction pattern generation unit generates as the number of pixels of which brightness exceeds the reference brightness in the original image data is larger. Therefore the generation of noise can be suppressed.

In the above display device, it is preferable that the display device further comprises a peripheral state acquisition unit that acquires information representing peripheral brightness of the display device, wherein the display control unit decreases a size of a diffraction pattern the diffraction pattern generation unit generates in a case where information representing the brightness indicates that peripheral brightness of the display device is a predetermined reference value or higher.

According to this configuration, the peripheral state acquisition unit acquires information representing the peripheral brightness of the display device. The display control unit decreases a size of a diffraction pattern the diffraction pattern generation unit generates in a case where the information representing the brightness indicates that the peripheral brightness of the display device is a predetermined reference value or higher. In a case where the peripheral brightness of the display device is high, even when noise is generated, noise is not conspicuous. Therefore a computation cost required for generating a diffraction pattern can be suppressed without making the generated noise conspicuous.

In the above display device, it is preferable that the diffraction pattern generation unit generates, from the original image data, a plurality of diffraction patterns having mutually different phase distributions, and the display control unit causes the spatial modulation element to display the plurality of diffraction patterns sequentially, as the diffraction pattern to cause the spatial modulation element to display.

According to this configuration, the diffraction pattern generation unit generates, from the original image data, a plurality of diffraction patterns having mutually different phase distributions. The display control unit causes the spatial modulation element to display the plurality of diffraction patterns sequentially, as the diffraction pattern to cause the spatial modulation element to display. Accordingly, the phase distributions of the plurality of diffraction patterns to be sequentially displayed are mutually different. Thus, the speckle patterns generated by using a laser beam become different. As a result, the influence of the speckle noise can be reduced.

In the above display device, it is preferable that the diffraction pattern generation unit generates, from the original image data, a basic diffraction pattern having a larger number of pixels than a number of pixels of the spatial modulation element, and generates the plurality of diffraction patterns by respectively extracting, from the basic diffraction pattern, areas which have a size corresponding to the number of pixels of the spatial modulation element and at least a part of which is different from one another.

According to this configuration, the diffraction pattern generation unit generates, from the original image data, a basic diffraction pattern having a larger number of pixels than the number of pixels of the spatial modulation element. The diffraction pattern generation unit generates the plurality of diffraction patterns by respectively extracting, from the basic diffraction pattern, areas which have a size corresponding to the number of pixels of the spatial modulation element and at least a part of which is different from one another. Therefore a plurality of diffraction patterns can be generated merely by performing the computation of the basic diffraction pattern as a computation of the diffraction patterns. Thus, diffraction patterns less influenced by the speckle noise can be generated at high-speed.

INDUSTRIAL APPLICABILITY

The display device according to the present invention is useful as a display device, such as an HMD, which has, near an eyeball, a spatial modulation element that diffracts a laser illumination light by displaying a diffraction pattern, and in which the diffracted light from the spatial modulation element reaches an assumed eyeball position. The display device can also be applied to a display system, a display method, a display device design method, and the like.

The invention claimed is:

1. A display device, comprising:
   a light source that outputs a laser beam;
   an illumination optical system that emits illumination light of the laser beam;
   a diffraction pattern generation unit that generates a diffraction pattern from original image data;
   a spatial modulation element that diffracts the illumination light by displaying the diffraction pattern;
   a display control unit that controls at least one of the spatial modulation element and the diffraction pattern generation unit, and
   a device state acquisition unit that acquires at least one of information on a remaining amount of a battery for supplying power, information on a utilization ratio of a computing unit for performing computing including generation of the diffraction pattern by the diffraction pattern generation unit, information on a utilization ratio of a storage unit for storing data, and information on a communication band of a communication unit for communicating with an external device, wherein
   the display control unit causes the diffraction pattern generation unit to change a size of the diffraction pattern according to the information acquired by the device state acquisition unit.

2. The display device according to claim 1, wherein
   the spatial modulation element includes a first spatial modulation element that displays a first diffraction pattern for a right eye of a user, and a second spatial modulation element that displays a second diffraction pattern for a left eye of the user, and the diffraction pattern generation unit generates the first diffraction pattern and the second diffraction pattern so that the first diffraction pattern and the second diffraction pattern are different from each other.

3. The display device according to claim 2, wherein the diffraction pattern generation unit generates random phase distribution data, generates the diffraction pattern from phase superposed image data in which the generated phase distribution data is superposed on the original image data, and changes phase distribution data to be used for generating the first diffraction pattern and for generating the second diffraction pattern.

4. The display device according to claim 2, wherein the diffraction pattern generation unit generates the first diffraction pattern and the second diffraction pattern of which sizes are different from each other.

5. The display device according to claim 2, wherein the diffraction pattern generation unit separates the original image data into first original image data for a right eye and second original image data for a left eye, generates the first diffraction pattern from the first original image data, and generates the second diffraction pattern from the second original image data.

6. The display device according to claim 2, wherein the display control unit alternately performs display of the first diffraction pattern by the first spatial modulation element, and display of the second diffraction pattern by the second spatial modulation element.

7. The display device according to claim 1, wherein
the display control unit includes a cost determination unit that determines an allowable computation cost indicating computation resources that can be used for generating a diffraction pattern by the diffraction pattern generation unit, based on the information acquired by the device state acquisition unit, and
the display control unit causes the diffraction pattern generation unit to decrease a size of the diffraction pattern as a value of the allowable computation cost becomes smaller.

8. The display device according to claim 1, further comprising an image determination unit that determines, based on the original image data, at least one of information on a brightness distribution that represents a brightness of each pixel in the original image data, and information on a number of pixels of which brightness exceeds a predetermined reference brightness among each pixel in the original image data, wherein
the display control unit causes the diffraction generation unit to change a size of the diffraction pattern according to the information determined by the image determination unit.

9. The display device according to claim 8, wherein the display control unit causes the diffraction pattern generation unit to increase a size of the diffraction pattern as a number of pixels of which brightness exceeds the reference brightness in the original image data becomes larger.

10. The display device according to claim 1, further comprising a peripheral state acquisition unit that acquires information representing peripheral brightness of the display device, wherein
the display control unit causes the diffraction pattern generation unit to change the size of the diffraction pattern in a case where information representing the brightness indicates that peripheral brightness of the display device is a predetermined reference value or higher.

* * * * *